United States Patent
Uesugi

(10) Patent No.: US 7,133,642 B2
(45) Date of Patent: Nov. 7, 2006

(54) APPARATUS AND METHOD FOR INTERFERENCE SUPPRESSION TRANSMISSION

(75) Inventor: Mitsuru Uesugi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 811 days.

(21) Appl. No.: 09/913,608

(22) PCT Filed: Dec. 15, 2000

(86) PCT No.: PCT/JP00/08939

§ 371 (c)(1),
(2), (4) Date: Aug. 16, 2001

(87) PCT Pub. No.: WO01/45298

PCT Pub. Date: Jun. 21, 2001

(65) Prior Publication Data

US 2002/0168941 A1    Nov. 14, 2002

(30) Foreign Application Priority Data

Dec. 17, 1999 (JP) ................ 11-358744

(51) Int. Cl.
*H04B 1/10* (2006.01)
*H04B 15/00* (2006.01)
(52) U.S. Cl. .................. 455/63.1; 455/296
(58) Field of Classification Search .......... 455/63.1, 455/500, 501, 561, 284, 285, 292, 296, 423, 455/562.1
See application file for complete search history.

(56) References Cited

U.S. PATENT DOCUMENTS

| | | | | |
|---|---|---|---|---|
| 5,495,496 A | * | 2/1996 | Bond et al. | 375/130 |
| 5,566,209 A | | 10/1996 | Forssen et al. | 375/262 |
| 6,131,013 A | * | 10/2000 | Bergstrom et al. | 455/63.1 |
| 6,215,983 B1 | * | 4/2001 | Dogan et al. | 455/63.1 |
| 6,317,586 B1 | | 11/2001 | Haardt | 455/67.16 |
| 6,330,294 B1 | * | 12/2001 | Ansbro et al. | 375/347 |
| 2002/0159506 A1 | * | 10/2002 | Alamouti et al. | 375/147 |

FOREIGN PATENT DOCUMENTS

DE    19803188    7/1999
EP    0184383    6/1986

(Continued)

OTHER PUBLICATIONS

Supplementary European Search Report dated Dec. 9, 2004.

*Primary Examiner*—Benny Q. Tieu
(74) *Attorney, Agent, or Firm*—Stevens, David, Miller & Mosher, LLP

(57) ABSTRACT

A channel estimation section 112 estimates the states of channels used for pieces of mobile station apparatus (A) and (B), using signals demodulated by radio processing sections 110, 111. A best SIR calculation section 118 calculates coefficients to be used for signal transformation by inverse matrix calculation, using the above channel estimation values by the above channel estimation section 112. A signal transformation section 119 performs linear transformation of transmission signals to the above pieces of mobile station apparatus, using the above coefficients from the above best SIR calculation section 118. Radio processing sections 120, 121 modulates each transmission signal after the above linear transformation for transmission through antennas 108, 109, respectively.

8 Claims, 16 Drawing Sheets

FOREIGN PATENT DOCUMENTS

| | | |
|---|---|---|
| EP | 0961416 | 12/1999 |
| JP | 63279623 | 11/1988 |
| JP | 01157112 | 6/1989 |
| JP | 03179820 | 8/1991 |
| JP | 04307820 | 10/1992 |
| JP | 05145445 | 6/1993 |
| JP | 07095655 | 4/1995 |
| JP | 07177569 | 7/1995 |
| JP | 10271051 | 10/1998 |
| WO | 9700543 | 1/1997 |

\* cited by examiner

RPS:RADIO PROCESSING SECTION
CES:CHANNEL ESTIMATION SECTION

RPS: RADIO PROCESSING SECTION
CES: CHANNEL ESTIMATION SECTION
BSCS: BEST SIR CALCULATION SECTION
UEES: UNSTABLE ELEMENT EXPULSION SECTION
SDS: STABILITY DISCRIMINATION SECTION
MVLS: MAXIMUM VALUE LIMITING SECTION
NGS: NOISE GENERATION SECTION
BCSS: BEST COMBINATION SELECTION SECTION

APPARATUS AND METHOD FOR INTERFERENCE SUPPRESSION TRANSMISSION

TECHNICAL FIELD

The present invention relates to a piece of communication apparatus in a mobile communication system, and, especially, to a piece of communication apparatus provided with an interference canceller.

BACKGROUND ART

Conventional communication systems in which a piece of communication apparatus provided with an interference canceller is used are shown as follows. FIG. 1 is a view showing a configuration of a piece of conventional base station apparatus provided with an interference canceller, and a system in which the above base station apparatus performs radio communication with pieces of mobile station apparatus.

FIG. 1 shows that a piece of mobile station apparatus (A) 1601 and that of (B) 1602 perform radio communication with a piece of base station apparatus 1607. Here, the mobile station apparatus (A) 1601, and that of (B) 1602 use wireless channels 1603, 1604 and those 1605, 1606, respectively, for communication with the base station apparatus 1607. All the above wireless channels use the same frequency. Hereinafter, an uplink and a downlink will be separately described.

In the first place, the uplink will be described. Signals transmitted from the mobile station apparatus (A) 1601, and that from (B) 1602 are received by antennas 1608, 1609 of the base station apparatus 1607.

In the base station apparatus 1607, the signals received by the antennas 1608, 1609 are demodulated by radio processing sections 1610, 1611, respectively. In a channel estimation section 1612, the states of the wireless channels 1603 through 1606 are estimated using the demodulated signals.

In an interference canceller 1613, a received signal 1614 of the mobile station apparatus (A) and a received signal 1615 of the mobile station apparatus (B) after cancellation of the mutual interference are obtained using the demodulation signals from the radio processing section 1610, and that from the radio processing section 1611, respectively, based on the estimation results by the channel estimation section 1612.

Thereby, though both of a transmission signal of the mobile station apparatus (A) and that of (B) are carried in the same frequency, the received signals 1614, 1615 with cancelled interference are obtained in the base station 1607. Therefore; improved frequency efficiency may be obtained for the uplink, as signals of a plurality of users are multiplexed in the same frequency.

Then, the downlink will be described. In the base station apparatus 1607, a transmission signal 1616 to the mobile station apparatus (A), and a transmission signal 1617 to the mobile station apparatus (B) are modulated by radio processing sections 1618, 1619, respectively. The signals modulated by the radio processing sections 1618 and that by 1619 are transmitted through the antennas 1608, 1609.

In the mobile station apparatus (A) and that of (B), a signal mixing the transmission signals 1616, 1617 transmitted from the base station apparatus is received. Then, desired signals maybe separated from a signal mixing signals of a plurality of users by provision of a similar interference canceller to that of the base station apparatus 1607 even in the mobile station apparatus (A) and that of (B). Thereby, improved frequency efficiency may be also obtained for the downlink, as signals of a plurality of users are multiplexed in the same frequency.

However, pieces of communication apparatus provided with a conventional interference canceller have had the following problems. That is, the above interference canceller requires a large amount of calculations, and information (for example, unique words) on all the users using the same frequency. Therefore, there has been a problem that it is difficult to install a piece of communication apparatus provided with the above conventional interference canceller in pieces of mobile station apparatus, considering the electric power consumption, the cost, the size, the complexity of the control signals, and so on.

Moreover, pieces of communication apparatus provided with the conventional interference canceller have had a problem that the quality of received signals is deteriorated by the effects of delay waves, when there are the above delay waves in channels used, as the above pieces of communication apparatus suppress only the effect of interference.

DISCLOSURE OF INVENTION

The object of the present invention is to provide a piece of apparatus for interference suppression transmission by which a communication end may obtain with a simple configuration signals without effect of interference or delay waves.

The above object may be realized by transmission after transformation of transmission signals to each communication end so that effects of interference, delay waves, and so on between signals for communication ends are cancelled at reception by each communication end.

BEST MODE FOR CARRYING OUT THE INVENTION

Hereinafter, the best mode of carrying out the invention will be described in detail, referring to drawings.

EMBODIMENT 1

Figure 1:
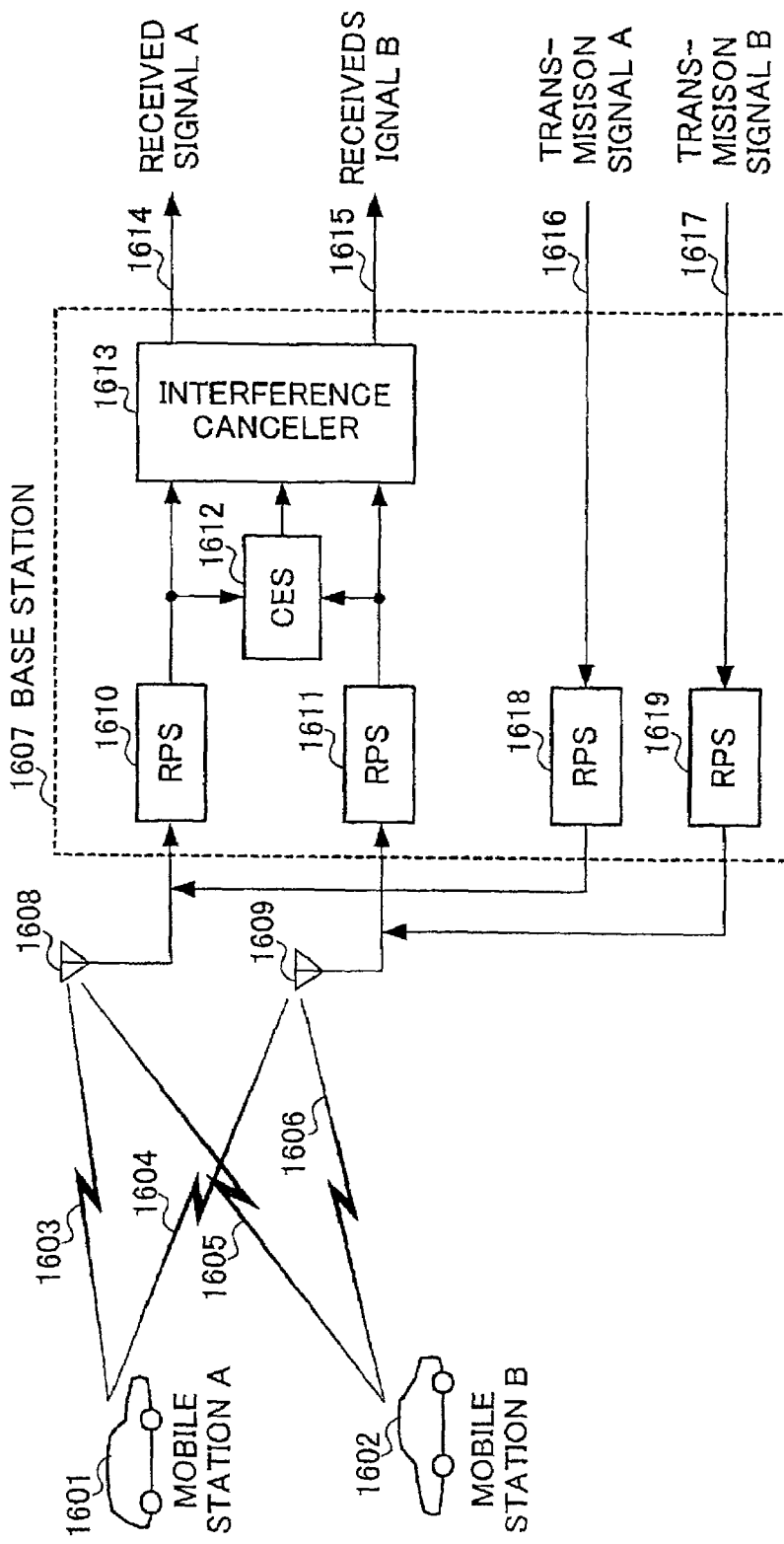
FIG. 1 is a view showing a configuration of a piece of base station apparatus provided with a conventional interference canceller, and a system in which the above base station apparatus performs radio communication with pieces of mobile station apparatus.
Figure 2:
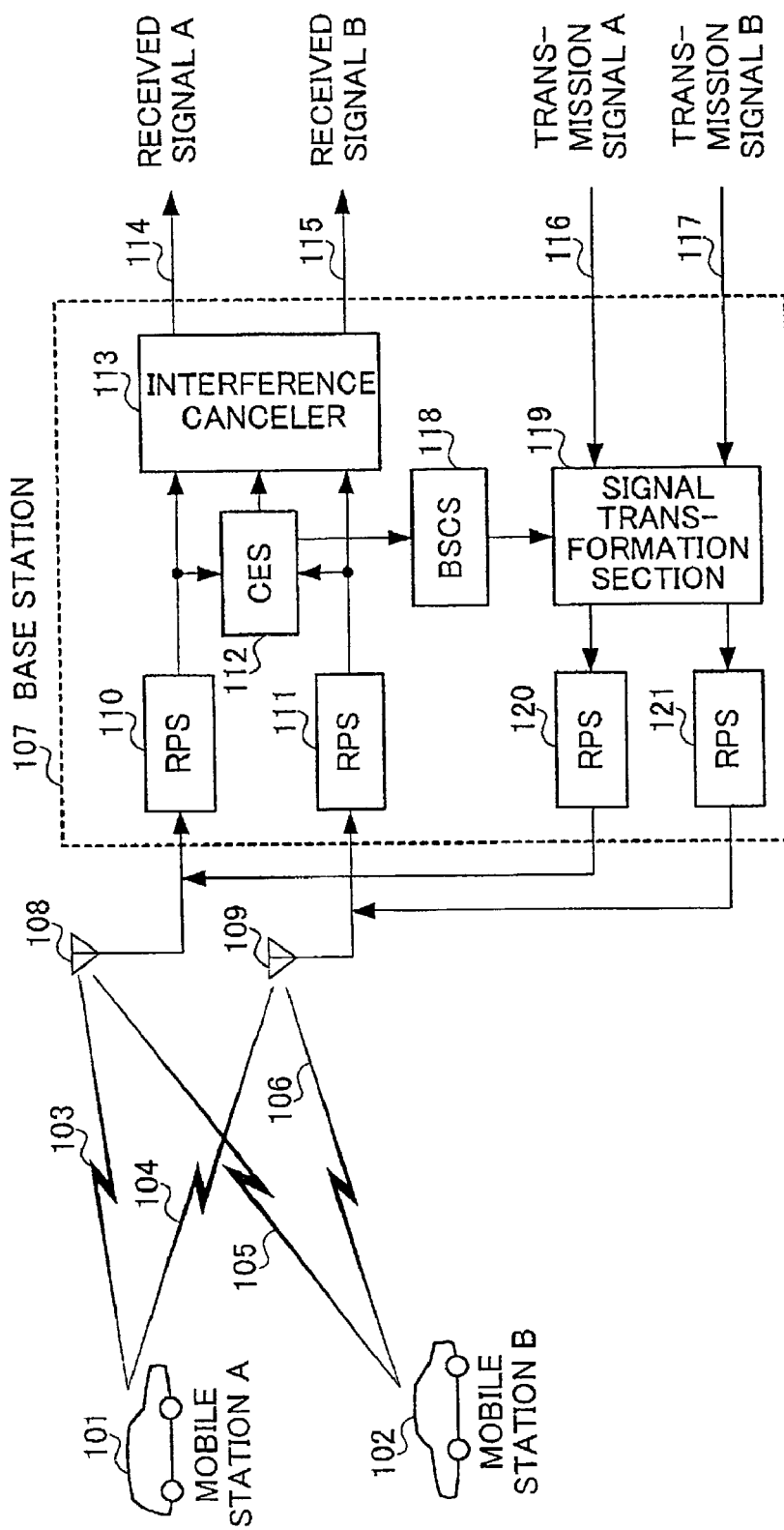
FIG. 2 is a view showing a configuration of a piece of base station apparatus provided with a piece of apparatus for interference suppression transmission according to an embodiment 1 of the present invention, and a system in which the above base station apparatus performs radio communication with pieces of mobile station apparatus.

FIG. 2 is a view showing a configuration of a piece of base station apparatus provided with a piece of apparatus for interference suppression transmission according to the embodiment 1 of the present invention, and a system in which the above base station apparatus performs radio communication with pieces of mobile station apparatus. FIG. 2 shows that a piece of base station apparatus 107 provided with a piece of apparatus for interference suppression transmission according to the present embodiment performs radio communication with a piece of mobile station apparatus (A) 101 and that of (B) 102 according to a TDD (Time Division Duplex) method.

Here, the mobile station apparatus (A) 101, and that of (B) 102 use wireless channels 103, 104 and those 105, 106, respectively, for communication with the base station apparatus 107. All the above wireless channels use the same frequency. And the present embodiment will be described for one example where there are two pieces of mobile station apparatus, and a piece of base station apparatus provided with two branch antennas, but there is no limitation in the number of pieces of mobile station apparatus (communication ends), and the number of installed antennas, if the latter number is equal to the that of pieces of mobile station apparatus for communication. Hereinafter, an uplink and a downlink will be separately described.

In the first place, the uplink will be described. A signal transmitted by the mobile station apparatus (A) 101, and that by (B) 102 are received by antennas 108, 109 of the base station apparatus 107.

In the base station apparatus 107, the signals received by the antennas 108, 109 are demodulated by radio processing sections 110, 111, respectively. In a channel estimation section 112, the states of the wireless channels 103 through 106 are estimated using the demodulated signals. Then, the channel estimation values of the channels 103 through 106 obtained by the channel estimation section 112 are sent to a best SIR (Signal to Interference Ratio) calculation section 118 described later. The above best SIR calculation section 118 will be described later.

In an interference canceller 113, there are obtained a received signal 114 of the mobile station apparatus (A) and a received signal 115 of the mobile station apparatus (B) after cancellation of the mutual interference using the demodulation signals from the radio processing section 110, and that from the radio processing section 111, respectively, based on the channel estimation values by the channel estimation section 112.

Thereby, the received signals 114, 115 with cancelled interference are obtained in the base station 107, though both a transmission signal of the mobile station apparatus (A) and that of (B) are carried in the same frequency. Therefore, improved frequency efficiency may be obtained for the uplink, as signals of a plurality of users are multiplexed in the same frequency.

Then, the downlink will be described in the base station apparatus 107, a transmission signal 116 to the mobile station apparatus (A), and a transmission signal 117 to that of (B) are sent to a signal transformation section 119.

In the above signal transformation section 119, linear transformation of the transmission signals 116, 117 is performed by a determinant using coefficients from the best SIR calculation section 118. That is, the linear transformation of the above transmission signals is performed by the following determinant (1), and a signal E to be output to a radio processing section 120 and that of F to a radio processing section 121 are obtained in the signal transformation section 119.

$$\begin{bmatrix} E \\ F \end{bmatrix} = \begin{bmatrix} x1 & y1 \\ x2 & y2 \end{bmatrix} \begin{bmatrix} A \\ B \end{bmatrix} \quad (1)$$

Where x1, x2, y1, and y2 are coefficients determined by the best SIR calculation section 118; and A and B are transmission signals 116, 117 respectively.

Here, a calculation method for the coefficients by the best SIR calculation section 118 will be described. In the first place, the following formula (2) is required to be minimized in order to obtain the maximum SIR for a received signal C at the mobile station apparatus (A) 101, and that for a received signal D at the mobile station apparatus (B) 102.

$$\{A(x1f1+x2f3-1)+B(y1f1+y2f3)\}^2+\{B(y1f2+y2f4-1)+A(x1f2+x2f4)\}^2- \quad (2)$$

Where f1 through f4 are the channel estimation values of the channels 103 through 106, respectively.

The coefficients X1, x2, y1, and y2, which make the above formula (2) minimum, are determined as solution under a condition that 0 is obtained in each formula derived by partial differentiation of the above formula (2) with respect to x1, x2, y1, and y2, respectively, when (A, B)=(1, 1), and, (A, B)=(1, −1).

Thereby, the following results are obtained:

$x1 = f4/(f1f4-f2f3);$ $x2 = f2/(f2f3-f1f4);$ $y1 = f3/(f2f3-f1f4);$ and $Y2 = f1/(f1f4-f2f3).$ Moreover, the same coefficients are obtained as solution under a condition that Y1f1+y2f3=0, and x1f2+x2f4=0 in each formula derived by partial differentiation of the above formula (2) with respect to x1, x2, y1, and y2, respectively, with a constraint that X1f1+x2f3=1, and Y1f2+y2f4=1.

In addition, each coefficient is obtained even in a multi-dimensional case by solving the inverse matrix of a matrix after arrangement of the states of the channels in the above matrix. A coefficient calculation method by the best SIR calculation section 118 has been described above.

The signals E, F output from the signal transformation section 119 are modulated by the radio processing sections 120, 121, respectively. Each signal modulated by the radio processing sections 120, 121 is transmitted through the antennas 108, 109, respectively.

Signals with cancelled interference are received in the mobile station apparatus (A) and that of (B). Thereby, improved channel capacity, that is, better frequency efficiency may be also obtained for the downlink, as signals of two users, that is, those of the mobile station apparatus (A) and that of (B) are multiplexed in the same frequency.

The present embodiment has been described for a case where signals of two pieces of mobile station apparatus are multiplexed, but the present invention is not limited to the above case, and is also applicable to other cases where signals of any number of pieces of mobile station apparatus are multiplexed. In the above cases, a corresponding number of antennas to that of pieces of mobile station apparatus are required to be installed, and the inverse matrix is needed to exist.

As described above, according to the present embodiment, each communication end may receive high quality signals without installation of a piece of special apparatus, such as an interference canceller, for suppression of interference among received signals, as transmission signals to each communication end are transmitted after transformation so that interference among signals for communication ends is cancelled at reception by each communication end. Thereby, each communication end may fetch with a simple configuration signals with cancelled effect of interference. Therefore, it is possible to provide a piece of apparatus for interference suppression transmission by which a communication end may obtain with a simple configuration signals with cancelled effect of interference.

EMBODIMENT 2

The embodiment 2 will be described for a case where more stable operation of the whole system is realized in the embodiment 1. In the above embodiment 1, the best SIR calculation section 118 calculates an inverse matrix, using channel states estimated in the channel estimation section 112. However, there is a condition that there is no inverse matrix, and, moreover, the above system becomes unstable as a transmission system, as the order of the solution becomes large when an inverse matrix which is calculated under a situation close to the above condition is used.

Then, in the present embodiment, it is configured in the above case that transmission to a piece of mobile station apparatus using channels with a possibility for instability is interrupted, and an inverse matrix is obtained again, using only states of stable channels. That is, as it is impossible to realize transmission with sufficient quality as the whole system even in the case of transmission with forced use of unstable coefficients to pieces of mobile station apparatus with a possibility for instability, it is configured that a signal with no significance at all is transmitted to a piece of mobile station apparatus with a possibility for instability, and stable transmission is performed to other pieces of mobile station apparatus. Hereinafter, a piece of apparatus for interference suppression transmission according to the present embodiment will be described, referring to FIG. 3.

Figure 3:
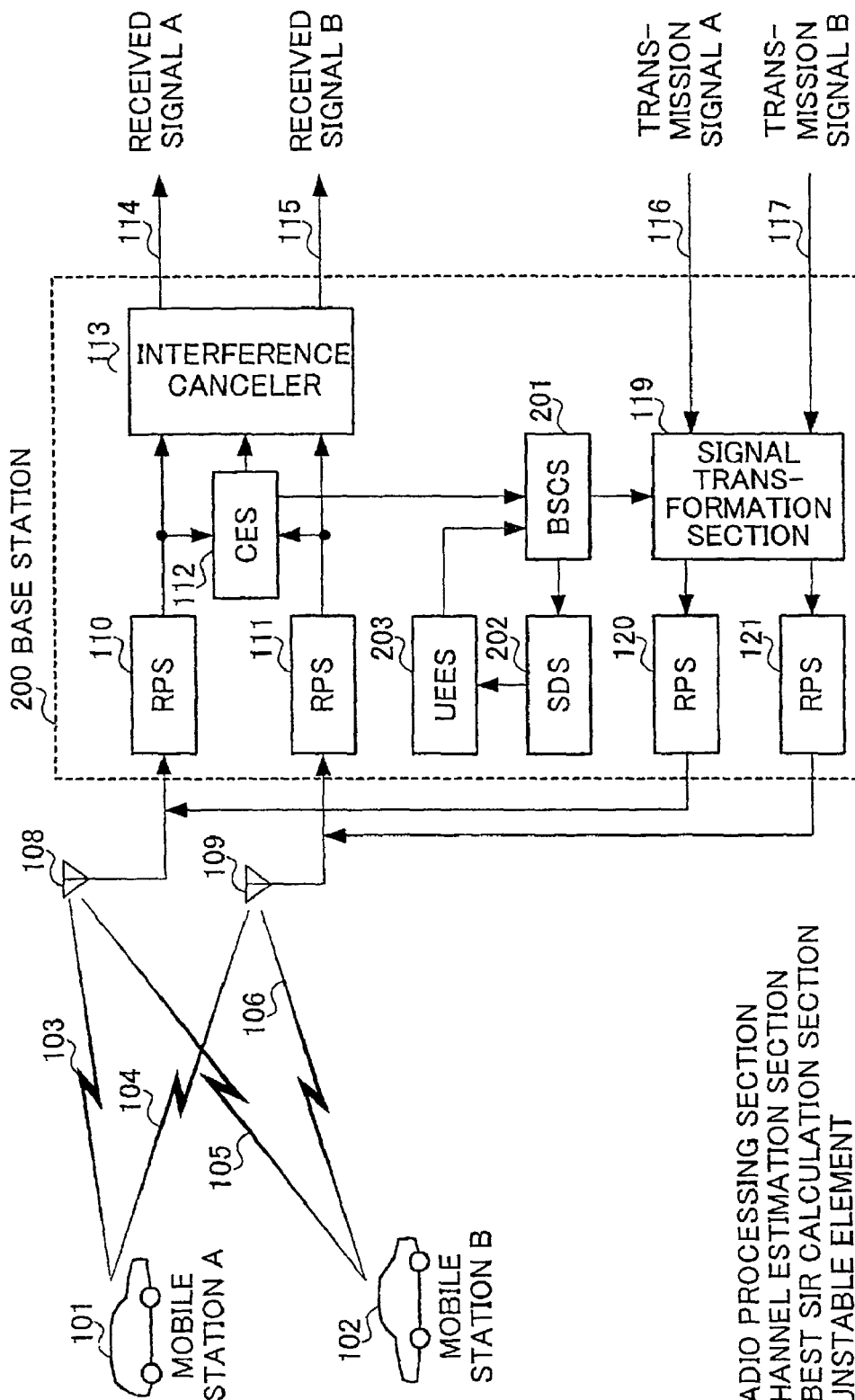
FIG. 3 is a view showing a configuration of a piece of base station apparatus provided with a piece of apparatus for interference suppression transmission according to an embodiment 2 of the present invention, and a system in which the above base station apparatus performs radio communication with pieces of mobile station apparatus.

FIG. 3 is a view showing a configuration of a piece of base station apparatus provided with a piece of apparatus for interference suppression transmission according to the embodiment 2 of the present invention, and a system in which the above base station apparatus performs radio communication with pieces of mobile station apparatus. Here, components which are shown in FIG. 3 and are similar to those in the embodiment 1 (FIG. 2) are denoted by the same reference numerals as those in FIG. 2, and the detailed description will be eliminated.

In the first place, a best SIR calculation section 201 calculates coefficients in a similar method to that of the embodiment described above. A stability discrimination section 202 discriminates the stability of the system using the calculation results by the best SIR calculation section 201. An unstable element expulsion section 203 instructs the best SIR calculation section 201 to obtain an inverse matrix, using only the states of stable channels without using the states of channels with a possibility for instability when the system is discriminated to be unstable by the stability discrimination section 202.

Then, the above calculation section 201 obtains an inverse matrix again by the above instruction from the above expulsion section 203, using only the states of stable channels.

Thus, according to the present embodiment, more stable operation of the whole system may be realized, as transmission to pieces of mobile station apparatus using channels with a possibility for system instability is interrupted, and linear transformation of transmission signals to pieces of mobile station apparatus other than the above mobile station apparatus is performed using the inverse matrix obtained only by the states of stable channels, when the transmission system becomes unstable, that is, for example, in the case of no inverse matrix, or in the close case to the above case.

EMBODIMENT 3

The embodiment 3 will be described for a case where the coefficients used in the signal transformation section 119 in the embodiment 1 or 2 are obtained by training.

Hereinafter, a piece of apparatus for interference suppression transmission according to the present embodiment will be described referring to FIG. 4. Here, the following description will be performed referring to the above embodiment 2.

Figure 4:
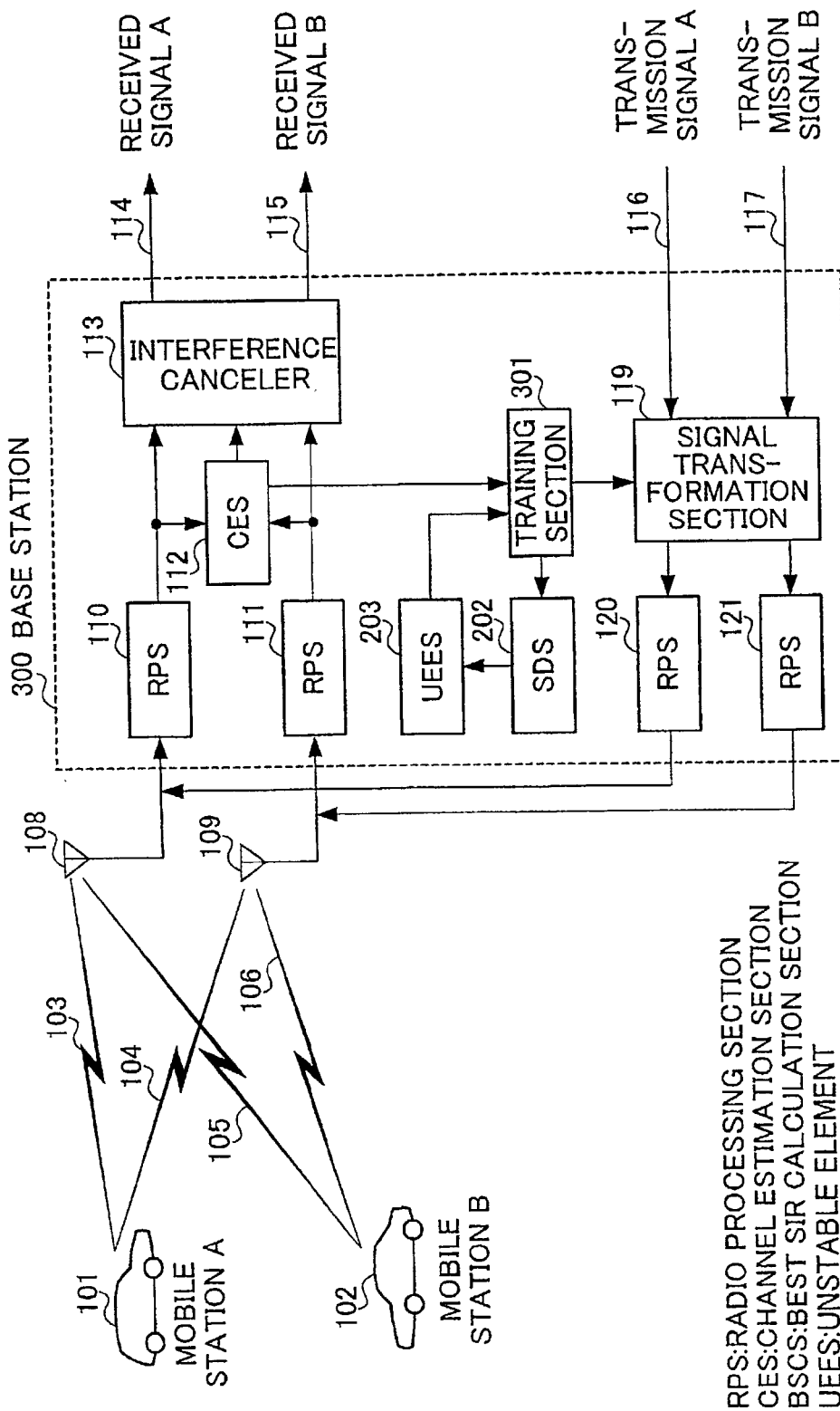
FIG. 4 is a view showing a configuration of a piece of base station apparatus provided with a piece of apparatus for interference suppression transmission according to an embodiment 3 of the present invention, and a system in which the above base station apparatus performs radio communication with pieces of mobile station apparatus.

FIG. 4 is a view showing a configuration of a piece of base station apparatus provided with a piece of apparatus for interference suppression transmission according to the embodiment 3 of the present invention, and a system in which the above base station apparatus performs radio communication with pieces of mobile station apparatus. Here, components which are shown in FIG. 4 and are similar to those in the embodiment 2 (FIG. 3) are denoted by the same reference numerals as those in FIG. 3, and the detailed description will be eliminated.

A piece of apparatus for interference suppression transmission according to the present embodiment comprises a training section 301 instead of the best SIR calculation section 201 in the above embodiment 2 (FIG. 3). The above training section 301 obtains coefficients (for example, x1, x2, y1, and y2, and so on as described above) to be used in the signal transformation section 119 by training.

That is, the training section 301 prepares different random transmission sequences for each piece of mobile station apparatus, and performs the similar linear transformation of the above transmission sequences to that of the signal transformation section 119. Then, the training section 301 estimates signals, which will be received respectively by the mobile station apparatus (A), and that of (B), using channel estimation values by the channel estimation section 112. In addition, the training section 301 compares the above estimated signals of each piece of mobile station apparatus and the random transmission sequences before the signal transformation, and updates the above coefficients so that the errors between the above estimated signals and the above transmission sequences are minimized.

The training section 301 may obtain quasi-optimal coefficients by repeating the above processing. Well-known methods such as a LMS method and an RLS one may be used for an algorithm used for convergence in the training section 301.

Thus, according to the present embodiment, better robustness, than that by an inversion calculation, may be realized by obtaining the coefficients to be used in the signal transformation section 119 not with the inverse matrix calculation, but with the training.

EMBODIMENT 4

The embodiment 4 will be described for a case where further improvement in the robustness is realized in the above embodiments 1 through 3. Hereinafter, a piece of apparatus for interference suppression transmission according to the present embodiment will be described referring to FIG. 5. Here, the following description will be performed referring to the above embodiment 3.

Figure 5:
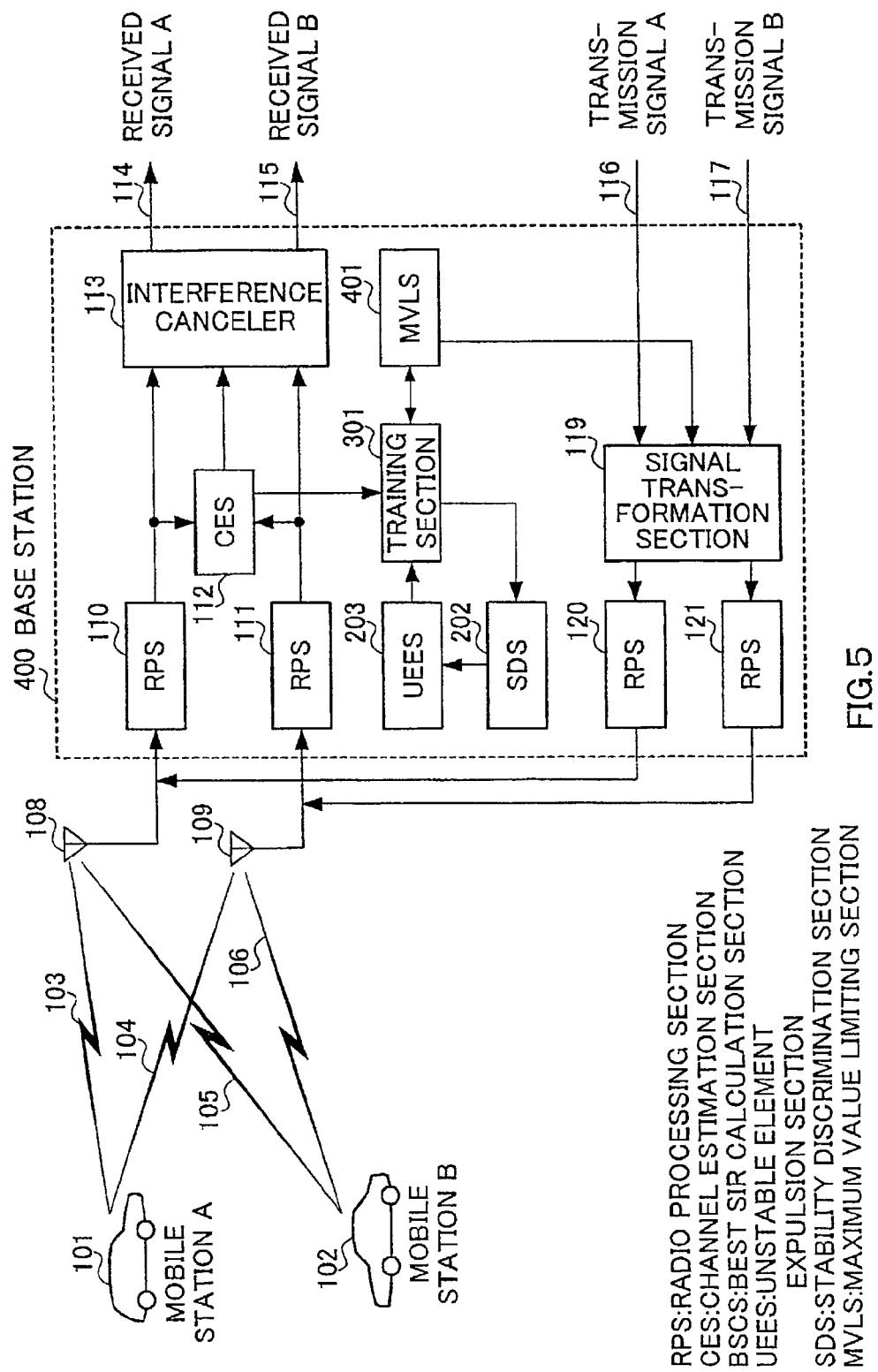
FIG. 5 is a view showing a configuration of a piece of base station apparatus provided with a piece of apparatus for interference suppression transmission according to an embodiment 4 of the present invention, and a system in which the above base station apparatus performs radio communication with pieces of mobile station apparatus.

FIG. 5 is a view showing a configuration of a piece of base station apparatus provided with a piece of apparatus for interference suppression transmission according to the embodiment 4 of the present invention, and a system in which the above base station apparatus performs radio communication with pieces of mobile station apparatus. Here, components which are shown in FIG. 5 and are similar to those in the embodiment 3 (FIG. 4) are denoted by the same reference numerals as those in FIG. 4, and the detailed description will be eliminated.

In the above embodiment 3, there is a condition where the system also becomes unstable, though the robustness in the case of obtaining the coefficients in the training section 301 may be made better than that at the inverse matrix calculation.

Accordingly, an apparatus for interference suppression transmission according to the present embodiment comprises a maximum value limiting section 401 which monitors the values of the coefficients obtained by the training section 301, and limits the maximum values of the above coefficients, when a coefficient with a possibility for making the system unstable are detected. The coefficients obtained by the training section 301 are output to the signal transformation section 119 by the maximum value limiting section 401 when the values of the above coefficients are within a predetermined range, and, on the other hand, the above coefficients limited in the maximum values are done to the above section 119 when the values exceed the above predetermined range. Thereby, a quasi-optimal solution may be obtained under a constraint of the maximum value limitation.

Thus, according to the present embodiment, further better robustness, than that in the embodiment 3, may be realized by using the coefficients limited in the maximum values, when the coefficients obtained by the training section have a possibility for making the system unstable.

EMBODIMENT 5

The embodiment 5 will be described for a case where improvement in the error rate characteristics is realized in the above embodiments 1 through 4. Hereinafter, a piece of apparatus for interference suppression transmission according to the present embodiment will be described referring to FIG. 6. Here, the following description will be performed referring to the above embodiment 4.

Figure 6:
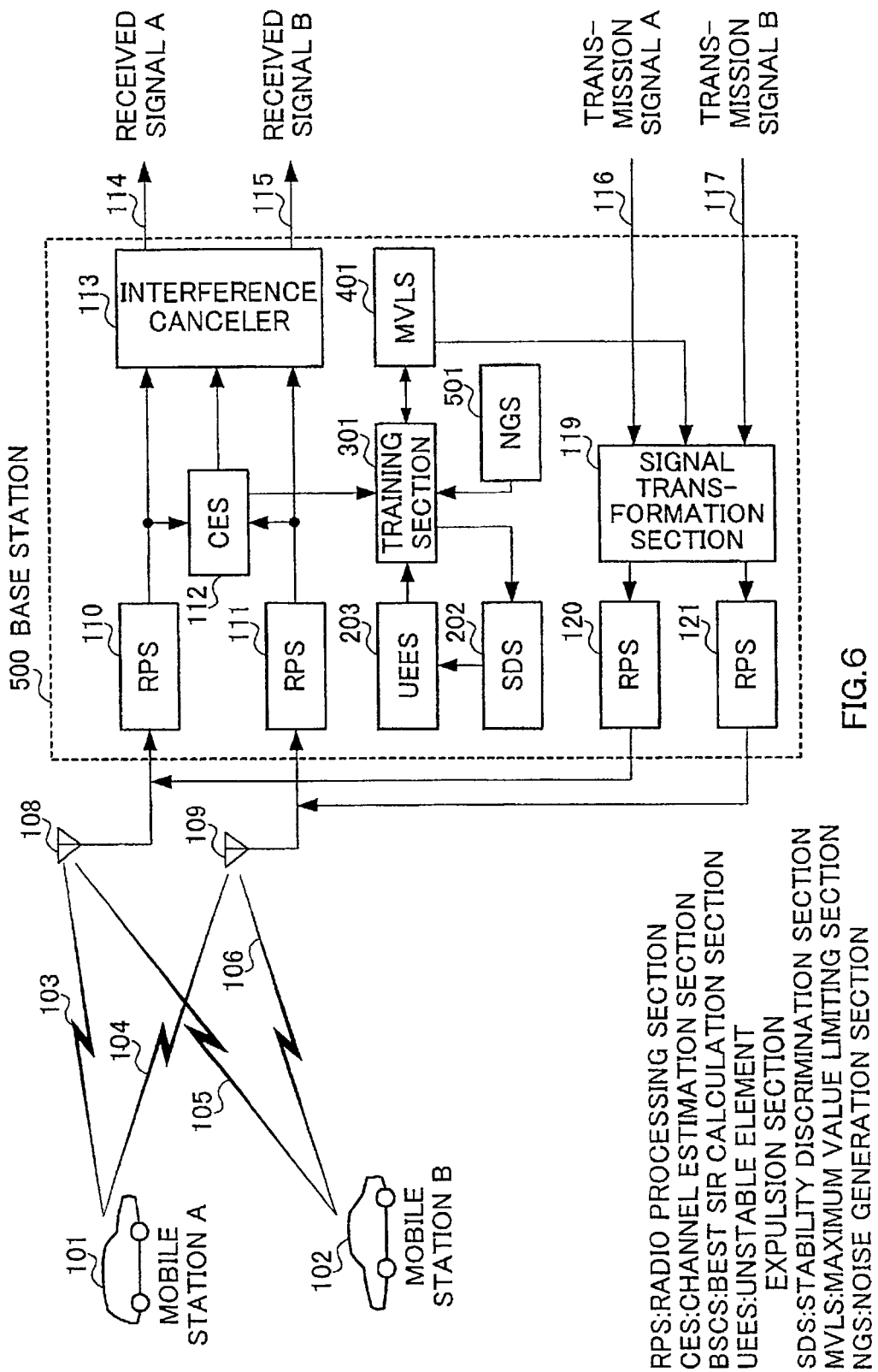
FIG. 6 is a view showing a configuration of a piece of base station apparatus provided with a piece of apparatus for interference suppression transmission according to an embodiment 5 of the present invention, and a system in which the above base station apparatus performs radio communication with pieces of mobile station apparatus.

FIG. 6 is a view showing a configuration of a piece of base station apparatus provided with a piece of apparatus for interference suppression transmission according to the embodiment 5 of the present invention, and a system in which the above base station apparatus performs radio communication with pieces of mobile station apparatus. Here, components which are shown in FIG. 6 and are similar to those in the embodiment 4 (FIG. 5) are denoted by the same reference numerals as those in FIG. 5, and the detailed description will be eliminated.

In the above embodiment 4, the SNR (Signal to Noise Ratio) controlling an actual error rate does not necessarily become the best in the mobile station apparatus, though the best SIR is obtained, as there is no consideration of noise mixed at the sides of the pieces of mobile station apparatus in the case of training.

Therefore, in the present embodiment, a noise generation section 501 generates noise with the same level as that of the noise which is assumed to be mixed in the mobile station apparatus (A) and that of (B), and outputs the above noise to the training section 301. The training section 301 may obtain coefficients with further improved error rate characteristics by training under mixture of the noise from the noise generation section 501.

Thus, according to the present embodiment, coefficients with improved error rate characteristics may be obtained by training including mixed noise received at the sides of the pieces of the mobile station apparatus.

EMBODIMENT 6

The embodiment 6 will be described for a case where improvement in the stability and interference canceling performance is realized in the above embodiments 1 through 5. Hereinafter, a piece of apparatus for interference suppression transmission according to the present embodiment will be described referring to FIG. 7. Here, the following description will be performed referring to the above embodiment 5.

Figure 7:
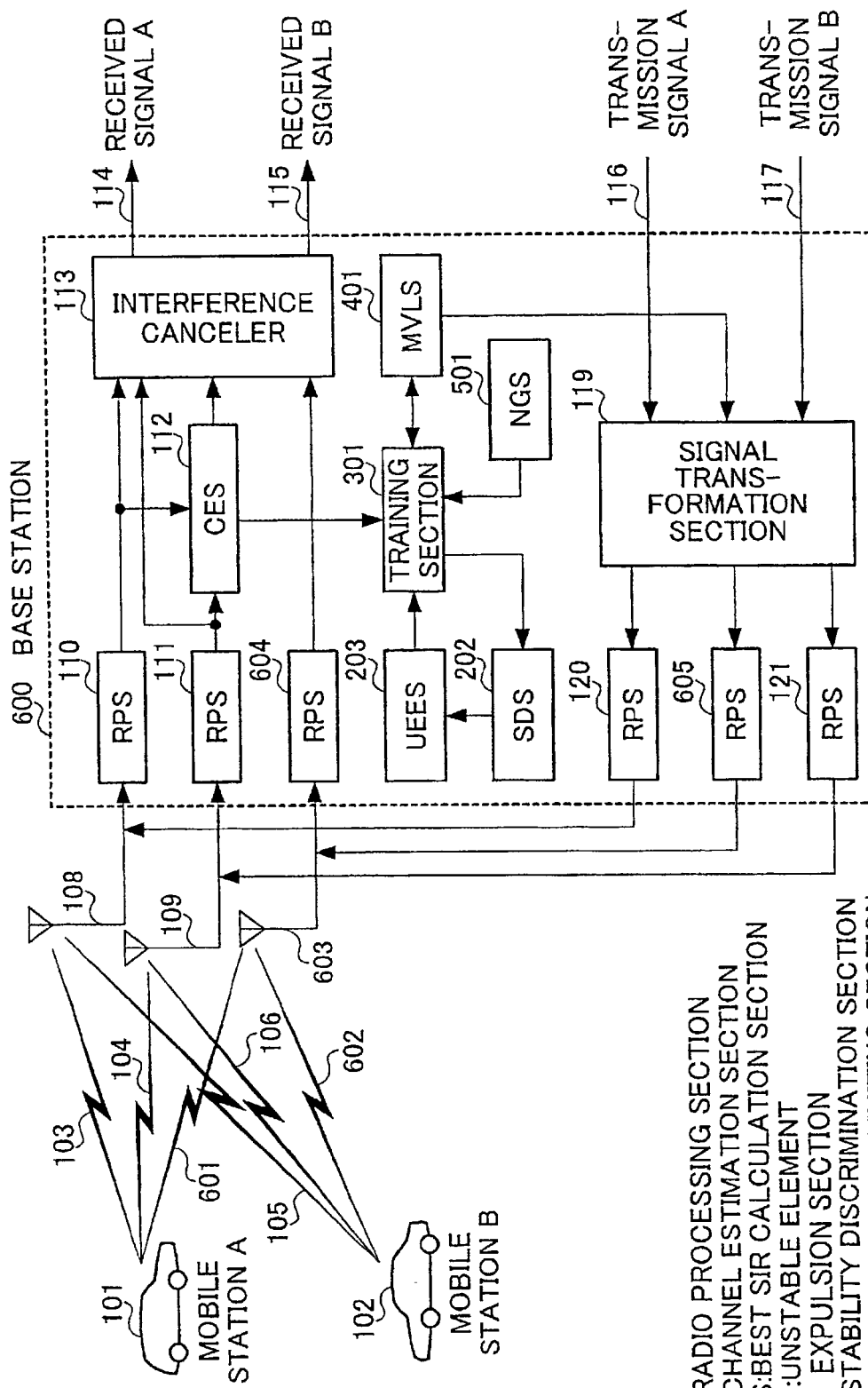
FIG. 7 is a view showing a configuration of a piece of base station apparatus provided with a piece of apparatus for interference suppression transmission according to an embodiment 6 of the present invention, and a system in which the above base station apparatus performs radio communication with pieces of mobile station apparatus.

FIG. 7 is a view showing a configuration of a piece of base station apparatus provided with a piece of apparatus for interference suppression transmission according to the embodiment 6 of the present invention, and a system in which the above base station apparatus performs radio communication with pieces of mobile station apparatus. Here, components which are shown in FIG. 7 and are similar to those in the embodiment 5 (FIG. 6) are denoted by the same reference numerals as those in FIG. 6, and the detailed description will be eliminated.

A difference between the present embodiment and the above embodiment 5 is that the number of antennas installed at a piece of base station apparatus 600 is larger than that of the pieces of mobile station apparatus. FIG. 7 shows a case where the base station apparatus 600 has, for example, three antennas. That is, the base station apparatus 600 comprises an antenna 603, other than the antennas 108, 109, and a radio processing section 605, other than the radio processing sections 120, 121.

The mobile station apparatus (A) 101 and that of (B) 102 use the wireless channels 103, 104, and a wireless one 601; and those 105,106, and a wireless one 602, respectively, for communication with the base station apparatus 600.

Signals received at the antenna 603 are demodulated by a radio processing section 604, and then output to the interference canceller 113. Here, the present radio processing section 604 has a similar configuration to that of the above radio processing section 110 or 111.

And, transmission signals after linear transformation by the signal transformation section 119 are modulated by the radio processing sections 120, 121, and 605, and then transmitted through the antennas 108, 109, and 603.

Thus, according to the present embodiment, the base station apparatus has less likelihood of instability as the freedoms are increased by providing a lager number of antennas of the base station apparatus than that of the pieces of mobile station apparatus. Thereby, the cancellation performance may be improved.

The present embodiment has been described for a case where the number of antennas installed at the base station apparatus is assumed to be three, but the present invention is not limited to the above case, and is also applicable to other cases where further increased number of antennas are installed. In the above cases, further improvement in the interference canceling performance may be realized.

EMBODIMENT 7

The embodiment 7 will be described for a case where antennas to be used are changed after selection from a plurality of provided antennas in the above embodiments 1 through 6. Hereinafter, a piece of apparatus for interference suppression transmission according to the present embodiment will be described referring to FIG. 8. Here, the following description will be performed referring to the above embodiment 6.

Figure 8:
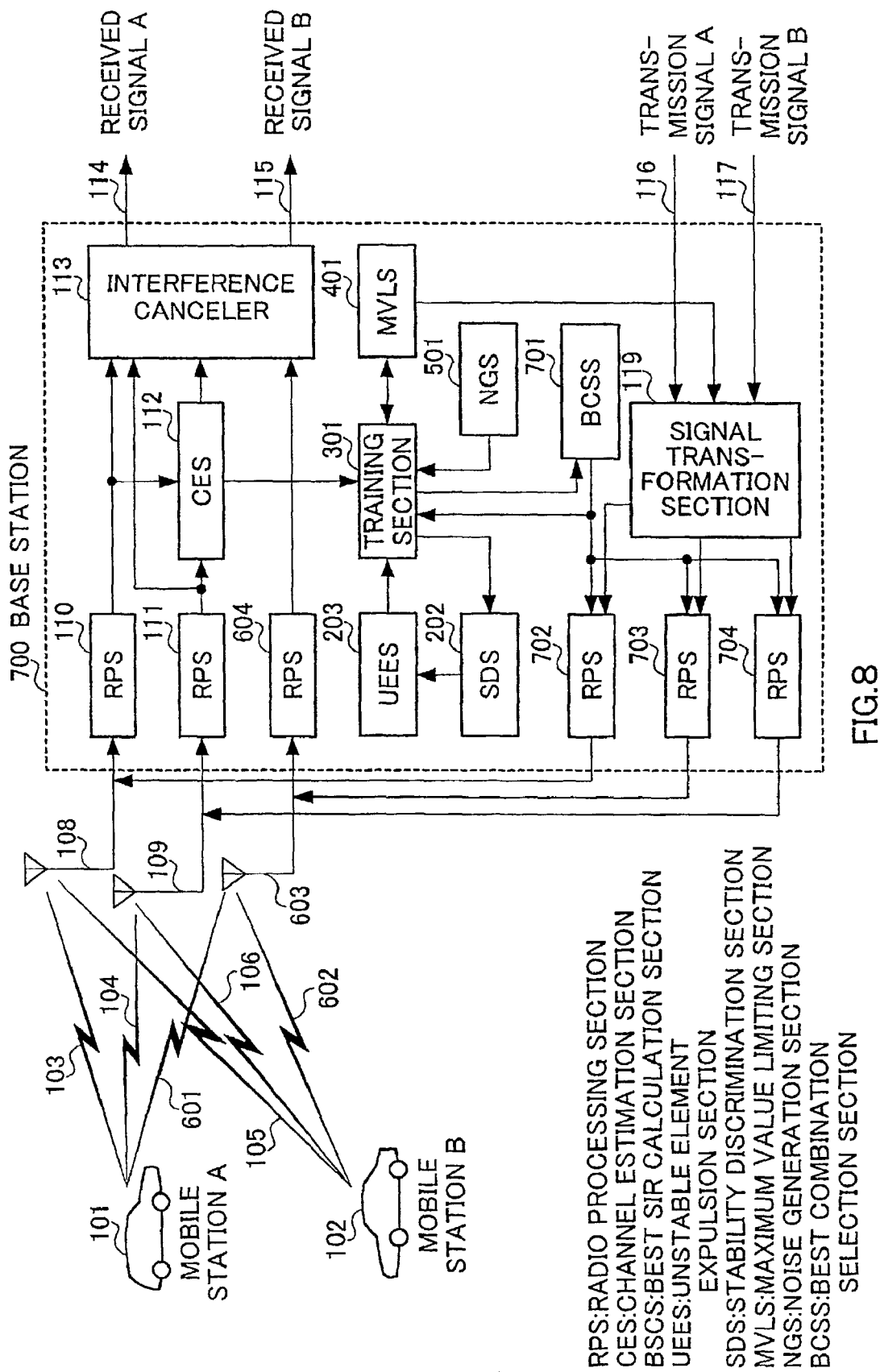
FIG. 8 is a view showing a configuration of a piece of base station apparatus provided with a piece of apparatus for interference suppression transmission according to an embodiment 7 of the present invention, and a system in which the above base station apparatus performs radio communication with pieces of mobile station apparatus.

FIG. 8 is a view showing a configuration of a piece of base station apparatus provided with a piece of apparatus for interference suppression transmission according to the embodiment 7 of the present invention, and a system in which the above base station apparatus performs radio communication with pieces of mobile station apparatus. Here, components which are shown in FIG. 8 and are similar to those in the embodiment 6 (FIG. 7) are denoted by the same reference numerals as those in FIG. 7, and the detailed description will be eliminated.

A difference between the present embodiment and the above embodiment 6 is that a best combination selection section 701 is provided. The best combination selection section 701 extracts the same number (two in the present embodiment) of antennas as that of pieces of mobile station apparatus from a larger number of antennas (antennas 108, 109, and 603) than that of pieces of mobile station apparatus as antennas to be used for training (or, inverse matrix calculation). That is, the best combination selection section 701 selects two antennas from three antennas according to the following judging criteria for determination of the best combination:

i) a combination by which power is minimized when transmission signals are transmitted using coefficients obtained by training or inverse calculation;

ii) a combination by which the minimum value among the coefficients obtained by training or inverse calculation is minimized;

iii) a combination by which power derived from the channel estimation value obtained in the channel estimation section 112 is used in the decreasing order; and iv) a combination by which a determinant is maximized.

Moreover, the best combination section 701 controls the training section 301, and radio processing sections 702 through 704 according to the above selection results after completion of the above selection. Thereby, the above training is performed according to the above selection results in the training section 301. Here, when training is not performed, but inverse matrix calculation is done, the above inverse matrix calculation is performed according to the above selection results, though not shown in FIG. 8.

The radio processing sections 702 through 704 modulate signals from the signal transformation section 119 for transmission through the antennas 108,109, and 603, respectively, in the case of transmission instruction from the best combination section 701.

Thus, according to the present embodiment, the quality of received signals at pieces of mobile station apparatus may be improved by using antennas selected as antennas to be used for transmission from a plurality of antennas installed so that the above antennas meet various kinds of requirements.

The present embodiment has been described for a case where the number of antennas installed at the base station apparatus is assumed to be three, but the present invention is not limited to the above case, and is also applicable to other cases where further increased number of antennas are installed.

EMBODIMENT 8

The embodiment 8 will be described for a case where each communication end without installation of a piece of special apparatus may receive a signal with suppressed effects of not only interference but also delay waves, even when there is a delay wave in a channel in the above embodiment 7. Hereinafter, a piece of apparatus for interference suppression transmission according to the present embodiment will be described referring to FIG. 9, in which the present invention is applied to the above embodiment 4. But, the present invention is also applicable to the above embodiments, other than the embodiment 4.

Figure 9:
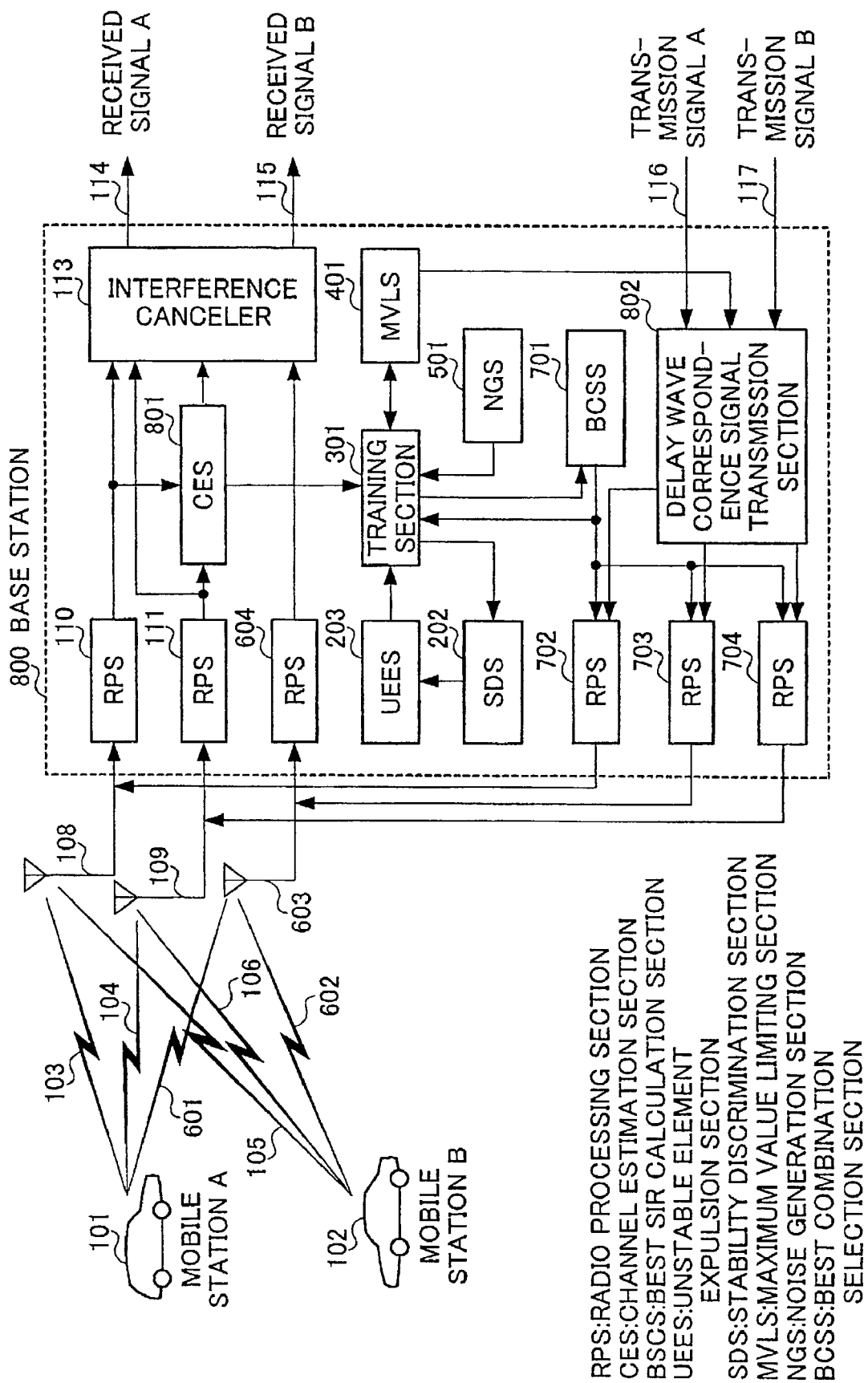
FIG. 9 is a view showing a configuration of a piece of base station apparatus provided with a piece of apparatus for interference suppression transmission according to an embodiment 8 of the present invention, and a system in which the above base station apparatus performs radio communication with pieces of mobile station apparatus.

FIG. 9 is a view showing a configuration of a piece of base station apparatus provided with a piece of apparatus for interference suppression transmission according to the embodiment 8 of the present invention, and a system in which the above base station apparatus performs radio communication with pieces of mobile station apparatus. Here, components which are shown in FIG. 9 and are similar to those in the embodiment 7 (FIG. 8) are denoted by the same reference numerals as those in FIG. 8, and the detailed description will be eliminated.

A difference between the present embodiment and the above embodiment 7 is that a delay wave correspondence signal transformation section 802, instead of the signal transformation section 119, is installed. Moreover, the channel estimation section 801 performs not only estimation of the states of each wireless channel, but also detection of delay waves in each wireless channel, using demodulated signals.

Here, the present embodiment will be described for one example where the antennas 108, 109 are selected, by the above best combination selection section 701, as antennas to be used, that is, where the wireless channels 103 through 106 are used for communication with pieces of mobile station apparatus.

The delay wave correspondence signal transformation section 802 transforms the transmission signals 116, 117 so that effect of interference between pieces of the mobile station apparatus and of delay waves is cancelled, when signals transmitted through the antennas 108, 109 are received by each piece of the mobile station apparatus.

The delay wave correspondence signal transformation section 802 performs linear transformation of the transmission signals 116, 117, considering delay waves. That is, the delay wave signal transformation section 801 performs linear transformation of the above transmission signals considering delay waves with the above determinant (1), and, then, signals E, F to be output to the radio processing sections 702, 704, respectively, are obtained. Here, A and B are the transmission signals 116, 117 respectively.

Hereinafter, a configuration of the delay wave correspondence signal transformation section 802 will be described. When there are delay waves (for example, two waves), each channel estimation value f1, f2, f3, and f4 of the wireless channels 103 through 106 is expressed as follows:

$$f1 = f_{10} + f_{11} \times Z^{\tau 1};$$

$$f2 = f_{20} + f_{21} \times Z^{\tau 2};$$

$$f3 = f_{30} + f_{31} \times Z^{\tau 3}; \text{ and}$$

$$f4 = f_{40} + f_{41} \times Z^{\tau 4}.$$

Here, $\tau 1$, $\tau 2$, $\tau 3$, and $\tau 4$ are time differences between a first wave and a second wave at f1, f2, f3, and f4, respectively. Here, all the time of advance waves at f1, f2, f3, and f4 are assumed to be in accordance with each other.

Figure 10:
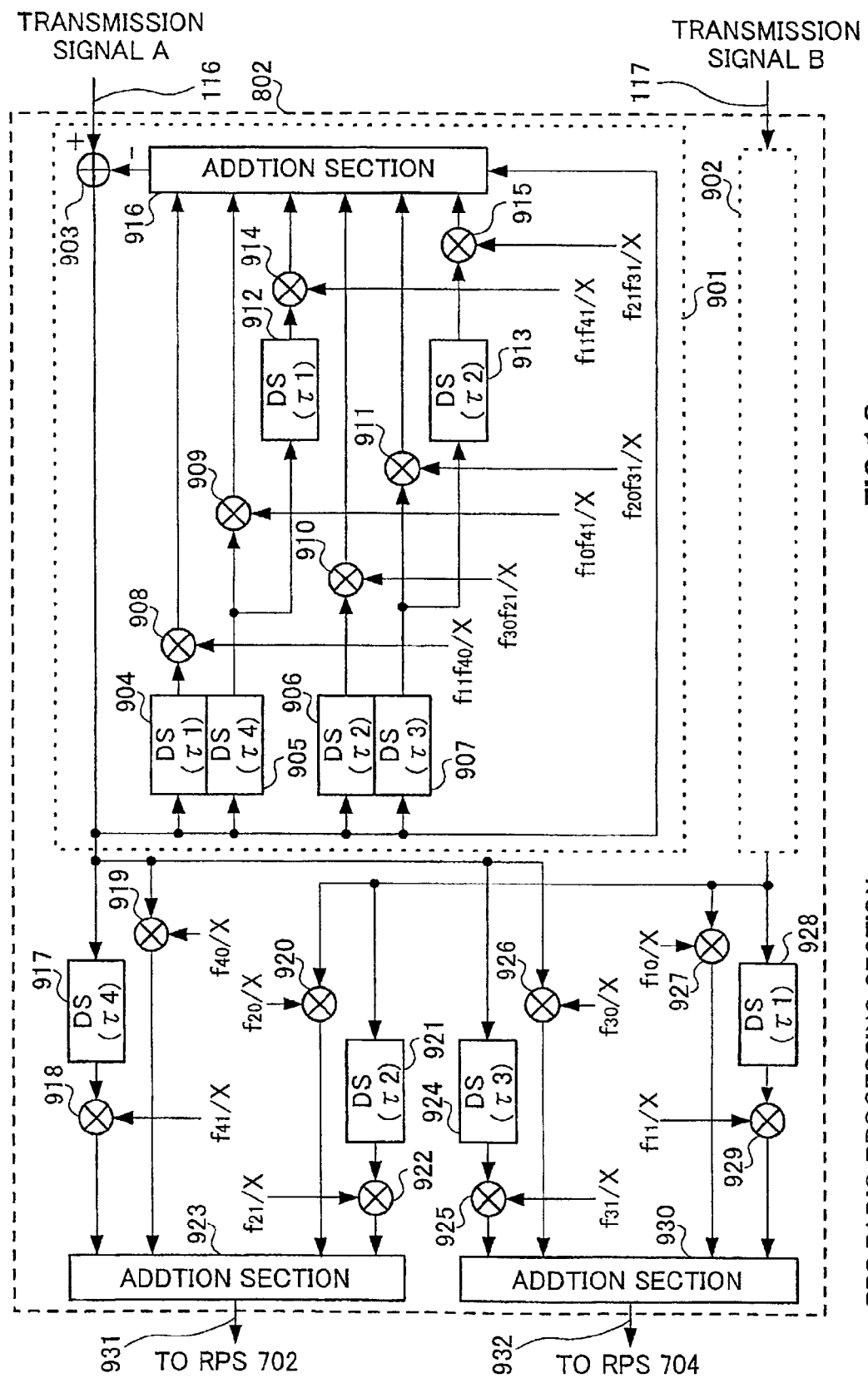
FIG. 10 is a block diagram showing a configuration of a delay wave correspondence signal transformation section in a piece of apparatus for interference suppression transmission according to the embodiment 8 of the present invention.

When the best values of x1, x2, y1, and y2 are calculated, using the above channel estimation values, $$x1 = (f_{40} + f_{41} \times Z^{\tau 4}) / \{X + (1+Y)\} - \qquad (3);$$

$$x2 = (f_{20} + f_{21} \times Z^{\tau 2}) / \{X + (1+Y)\} - \qquad (4);$$

$$y1 = (f_{30 \neq} + f_{31 \neq} \times Z^{-\tau 3 \neq}/\{X + (1+Y)\} - \qquad (5); \text{ and}$$

$$y2 = (f_{10} + f_{11} \times Z^{\tau 1}) / \{X + (1+Y)\} - \qquad (6).$$

where $X = f_{10} \times f_{40} - f_{20} \times f_{30}$, and $Y = 1 + f_{40} \times f_{11} \times Z^{\tau 1} + f_{10} \times f_{41} \times Z^{\tau 4} + f_{11} \times f_{41} \times Z^{(\tau 1 + \tau 4)} + f_{20} \times f_{31} \times Z^{\tau 3} + f_{30} \times f_{21} \times Z^{\tau 2} + f_{21} \times Z^{(\tau 2 + \tau 3)}.$ Therefore, the delay wave correspondence signal transformation section 802 may be configured by a circuit shown in FIG. 10.

FIG. 10 is a block diagram showing a configuration of a delay wave correspondence signal transformation section in a piece of apparatus for interference suppression transmission according to an embodiment 8 of the present invention.

IIR (Infinite Impulse Response) filters 901, 902 in FIG. 10 are expressed as $\{1/(1+Y)\}$ in the above formulae (3) through (6). The transmission signal 116 passes through the above IIR filter 901. The above transmission signal after passing through the IIR filter 901 is sent to an addition section 923 through a delay section 917 and a multiplication section 918, and a multiplication section 919. And, the transmission signal after passing through the IIR filter 901 is sent to an addition section 930 through a delay section 924 and a multiplication section 925, and a multiplication section 926.

On the other hand, the transmission signal 117 passes through the IIR filter 902. The transmission signal after passing through the IIR filter 902 is sent to the addition section 930 through a delay section 928 and a multiplication section 929, and a multiplication section 927. And, the transmission signal after passing through the IIR filter 902 is sent to the addition section 923 through a delay section 921 and a multiplication section 922, and a multiplication section 920.

Thereby, the signals E, F to be output to the radio processing sections 702, 704 are output from the addition sections 923, 930, respectively. Each piece of the mobile station apparatus may obtain received signals with cancelled effects of both interference and delay waves by transmission of the above signals E, F.

As described above, according to the present embodiment, each communication end may receive high quality signals without installation of a piece of special apparatus for cancellation of effect of interference between received signals, as the transmission signals to each communication end are transformed for transmission so that interference between signals for communication ends are cancelled at reception by each communication end. Thereby, each communication end may fetch with a simple configuration signals with cancelled effect of interference. Therefore, it is possible to provide a piece of apparatus for interference suppression transmission by which a communication end may obtain with a simple configuration signals without effects of interference and delay waves.

EMBODIMENT 9

The embodiment 9 will be described for a case where array antennas are used as antennas in the above embodiments 1 through 8. Hereinafter, a piece of apparatus for interference suppression transmission according to the present embodiment will be described referring to FIG. 11. Here, the following description will be performed referring to the above embodiment 1.

Figure 11:
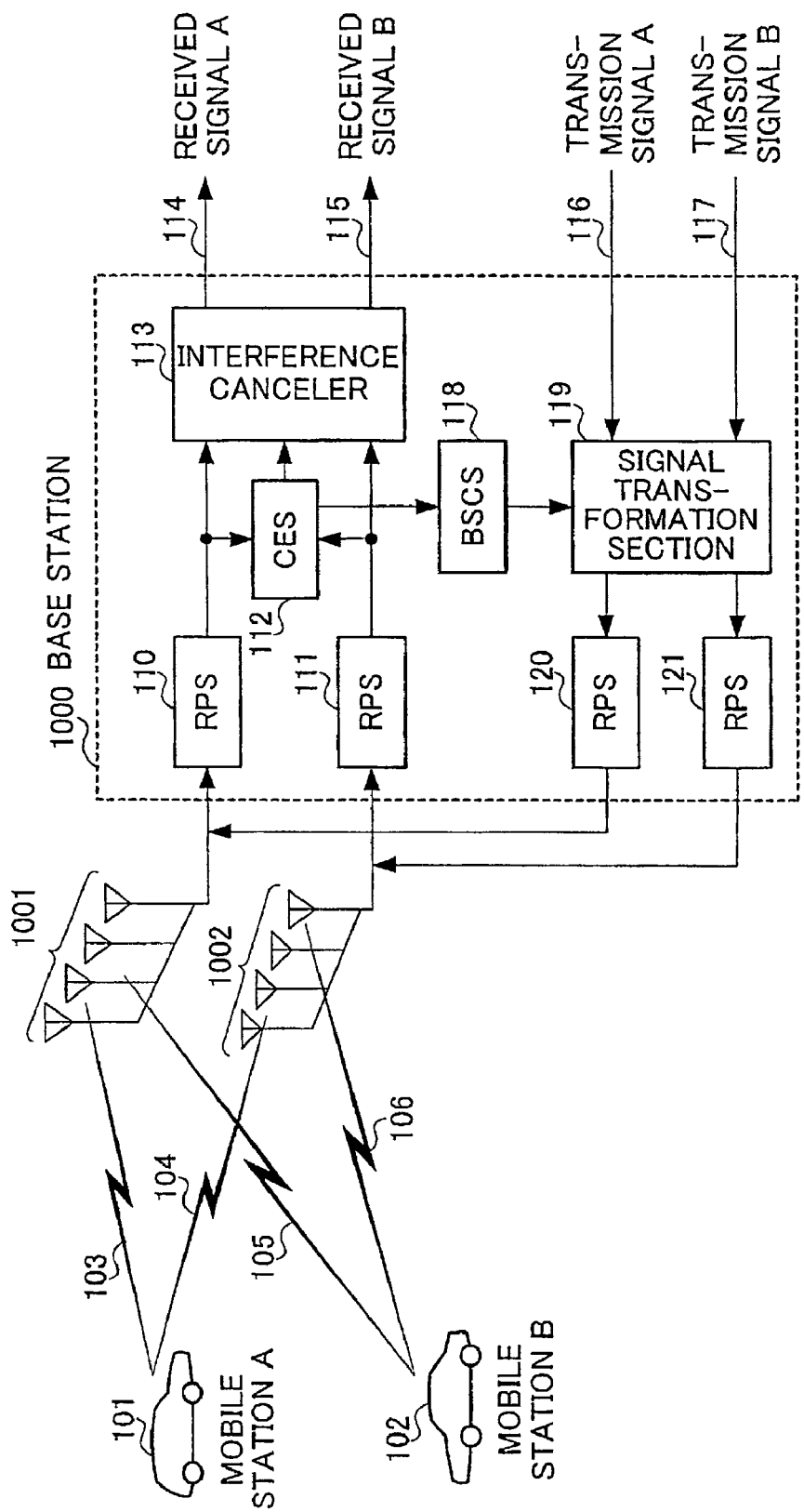
FIG. 11 is a view showing a configuration of a piece of base station apparatus provided with a piece of apparatus for interference suppression transmission according to an embodiment 9 of the present invention, and a system in which the above base station apparatus performs radio communication with pieces of mobile station apparatus.

FIG. 11 is a view showing a configuration of a piece of base station apparatus provided with a piece of apparatus for interference suppression transmission according to the embodiment 9 of the present invention, and a system in which the above base station apparatus performs radio communication with pieces of mobile station apparatus. Here, components which are shown in FIG. 11 and are similar to those in the embodiment 1 (FIG. 2) are denoted by the same reference numerals as those in FIG. 2, and detailed description will be eliminated.

A difference between the present embodiment and the above embodiment 1 is that a plurality of array antennas 1001 and those 1002, instead of the antennas 108, 109 are installed.

Transmission to pieces of mobile station apparatus with different incoming directions may be realized, as the directionality may be controlled in pieces of communication apparatus provided with array antennas. However, it is difficult to cancel interference among received signals at the above pieces of mobile station apparatus in the case of transmission from the above communication apparatus to pieces of mobile station apparatus with close directionality.

On the other hand, in a piece of apparatus for interference suppression transmission according to the above embodiment, the calculation amount is not only increased, but also the performance is deteriorated due to imperfection in the channel estimation and so on in the case of increased number of pieces of mobile station apparatus. Therefore, the performance is remarkably improved, as combination of the apparatus for interference suppression transmission according to the above embodiment and array antennas may make up for the both disadvantages.

Thus, according to the present embodiment, the performance may be improved by combination of the apparatus for interference suppression transmission according to the above embodiments 1 through 8 and array antennas.

EMBODIMENT 10

The embodiment 10 will be described for a case where communication is performed according to an FDD (Frequency Division Duplex) method in the above embodiments 1 through 9. Hereinafter, a piece of apparatus for interference suppression transmission according to the present embodiment will be described referring to FIG. 12. Here, the following description will be performed referring to the above embodiment 1.

In the above embodiments 1 through 9, the TDD method has been used for wireless communication. But, in the wireless communication according to the FDD method, frequencies used on an uplink and a downlink are different from each other. Here, in the present embodiment, each piece of mobile station apparatus notifies the channel estimation values of the downlink to the base station apparatus through the uplinks.

Figure 12:
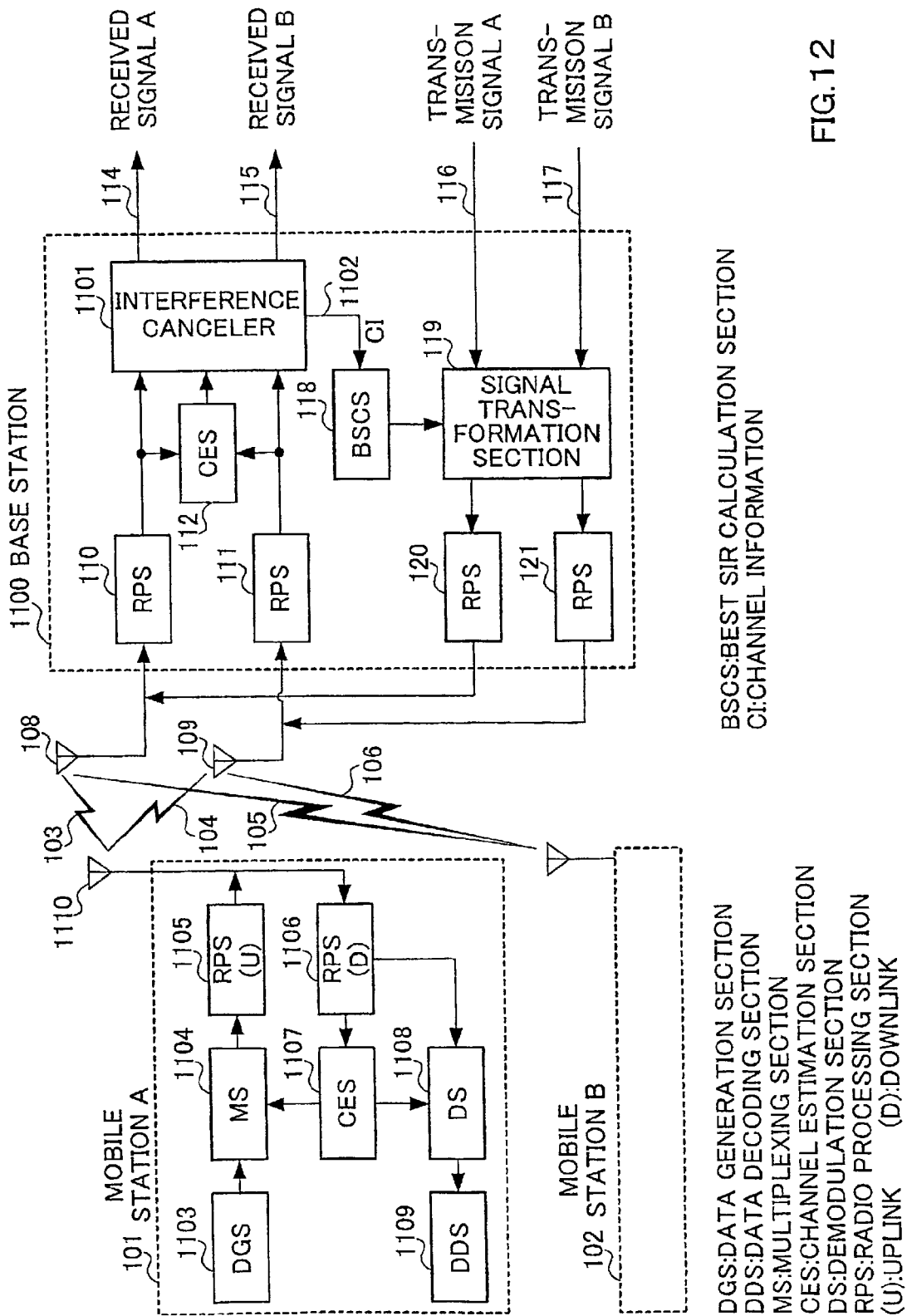
FIG. 12 is a view showing a configuration of a piece of base station apparatus provided with a piece of apparatus for interference suppression transmission according to an embodiment 10 of the present invention and that of a piece of mobile station apparatus, and a system in which the above base station apparatus performs radio communication with pieces of mobile station apparatus.

FIG. 12 is a view showing a configuration of a piece of base station apparatus provided with a piece of apparatus for interference suppression transmission according to the embodiment 10 of the present invention and that of a piece of mobile station apparatus, and a system in which the above base station apparatus performs radio communication with pieces of mobile station apparatus. Here, components which are shown in FIG. 12 and are similar to those in the embodiment 1 (FIG. 2) are denoted by the same reference numerals as those in FIG. 2, and detailed description will be eliminated.

In the first place, the mobile station apparatus (A) 101 and that of (B) 102 will be described. The above pieces of mobile station apparatus are similar to each other in configuration. A signal received through an antenna 1110 is sent to a channel estimation section 1107 and a demodulation section 1108 after predetermined processing such as frequency transformation by a radio processing section 1106 (downlink). In the above channel estimation section 1107, the state of the downlink is estimated from the received signal after the above processing. The channel estimation value of the downlink is sent to the demodulation section 1108 and a multiplexing section 1104. In the demodulation section 1108, demodulation processing of the received signal after the above predetermined processing is performed, using the above channel estimation value. Demodulation data is obtained by decoding of the signal after the demodulation processing by a data decoding section 1109.

On the other hand, a transmission signal is obtained in the multiplexing section 1104 by multiplexing the transmission data generated at the data generation section 1103, and the channel estimation value from the channel estimation section 1107. The above transmission signal is transmitted through the antenna 1110 after predetermined processing such as modulation frequency transformation by a radio processing section 1105 (uplink).

Then, a piece of base station apparatus 1100 will be described, focussing on differences between the embodiment 1 and the present one. In an interference canceller 1101, based on the channel estimation value by the channel estimation section 112, received signals of the pieces of mobile station apparatus (A), (B) with cancelled interference between signals for the above pieces are obtained, using the demodulation signals from the radio processing section 110 and those from the radio processing section 111, as described above.

In the above interference canceller 1101, channel estimation values of each downlink are extracted from the above received signals and are sent to the best SIR calculation section 118 as channel information 1102.

As described above, according to the present embodiment, each communication end may fetch signals with cancelled effect of interference (and delay waves) by a simple configuration even when the apparatus for interference suppression transmission according to the embodiments 1 through 9 is applied for communication according to the FDD method, as each piece of mobile station apparatus estimates the states of the downlinks using the received signals; and transmits the estimation results to the base station apparatus after multiplexing, and, on the other hand, the base station apparatus performs linear transformation of the transmission signals to each piece of mobile station apparatus using the states of the downlinks, which are included in the received signals and are corresponding to each piece of mobile station apparatus.

EMBODIMENT 11

The embodiment 11 will be described for a case where the piece of apparatus for interference suppression transmission according to the embodiments 1 through 10 is used for a mobile communication system. Hereinafter, a mobile communication system provided with a piece of apparatus for interference suppression transmission according to the present embodiment will be described referring to FIG. 13.

Figure 13:
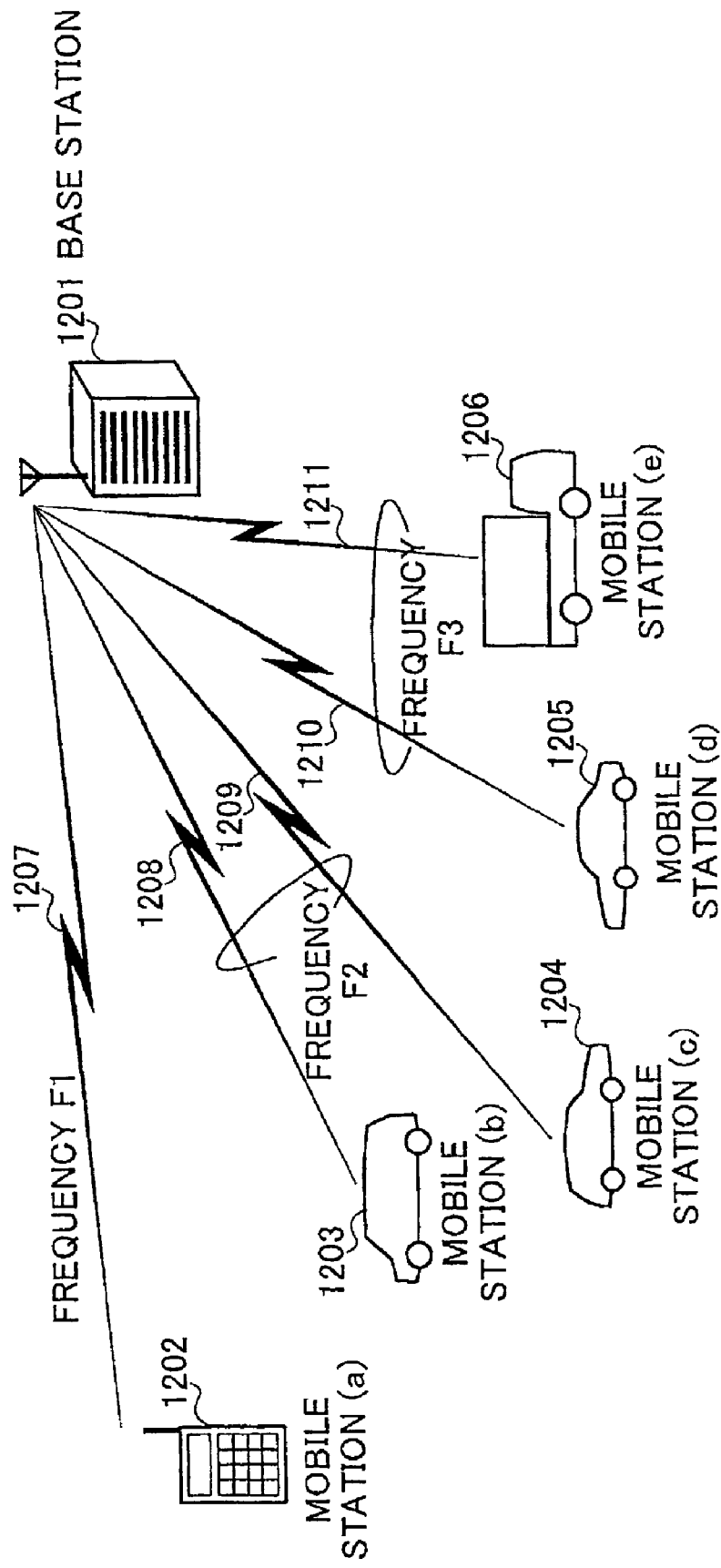
FIG. 13 is a view showing a mobile communication system using a piece of apparatus for interference suppression transmission according to the present invention.

FIG. 13 is a view showing the mobile communication system using a piece of apparatus for interference suppression transmission according to the present invention. FIG. 13 shows an example where a piece of base station apparatus 1201 accommodates five pieces of mobile station apparatus and three kinds of frequencies are used, but there is no limitation in these numbers.

The capacity may be improved, as the interference between different signals even at use of the same frequency for the uplink signal and the downlink one may be suppressed without installing interference cancellers and so on the pieces of mobile station apparatus (a) 1202 through (e) 1206 by provision of the above base station apparatus 1201 with a piece of apparatus for interference suppression transmission according to the embodiments 1 through 10.

In the present embodiment, radio communication is performed during use of a frequency of F1 for the mobile station apparatus (a) 1202; that of F2 for the pieces of mobile station apparatus (b) 1203 and (c) 1204; and that of F3 for the pieces of mobile station apparatus (d) 1205 and (e) 1206. That is, radio communication may be performed during use of the same frequency of F2 for the pieces of mobile station apparatus (b) 1203 and (c) 1204; and that of F3 for the pieces of mobile station apparatus (d) 1205 and (e) 1206, as the interference suppression may be realized. Thereby, the capacity may be improved.

Thus, in the present embodiment, the capacity in the mobile communication system may be improved, as the interference between different signals on the uplink signal and the downlink one by provision of the above base station apparatus with a piece of apparatus for interference suppression transmission according to the embodiments 1 through 10.

EMBODIMENT 12

The embodiment 12 will be described for a case where the piece of apparatus for interference suppression transmission according to the embodiments 1 through 10 is used for a mobile communication system. Hereinafter, a mobile communication system using a piece of apparatus for interference suppression transmission according to the present embodiment will be described referring to FIG. 14.

Figure 14:
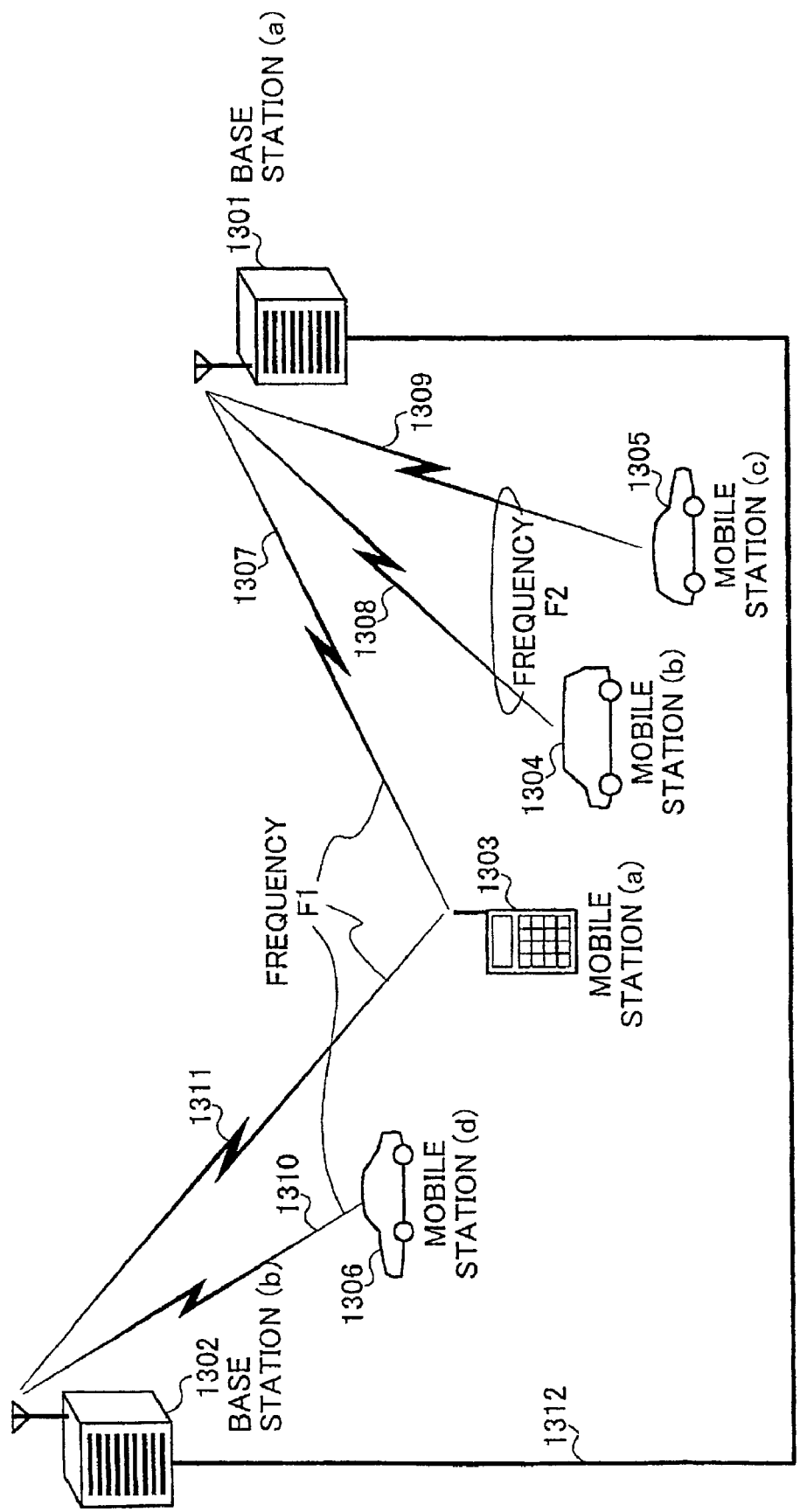
FIG. 14 is a view showing a mobile communication system using a piece of apparatus for interference suppression transmission according to the present invention.

FIG. 14 is a view showing a mobile communication system using a piece of apparatus for interference suppression transmission according to the present invention. FIG. 14 shows an example where a piece of base station apparatus (a) 1301 accommodates three pieces of mobile station apparatus, using two kinds of frequencies (F1 and F2); and a piece of base station apparatus (b) 1302 accommodates one piece of mobile station apparatus, using one kind of frequency (F1, but there is no limitation in the above numbers.

The capacity may be improved, as the interference between different signals even at use of the same frequency for the uplink signal and the downlink one may be suppressed without installing interference cancellers and so on the pieces of mobile station apparatus (a) 1303 through (d) 1306 by provision of the pieces of base station apparatus (a) 1301, and (b) 1302 with pieces of apparatus for interference suppression transmission according to the embodiments 1 through 10.

And, interference between signals for different pieces of base station apparatus may be suppressed, as the pieces of base station apparatus (a) 1301, and (b) 1302 are connected to each other through a communication channel 1312.

In the present embodiment, the mobile station apparatus (a) 1303 performs wireless communication with the base station apparatus (a) 1301 using a frequency F1; the pieces of mobile station apparatus (b) 1304, and (c) 1305 performs wireless communication with the base station apparatus (a) 1301 using a frequency F2; and the mobile station apparatus (d) 1306 performs wireless communication with the base station apparatus (b) 1302 using a frequency F3. That is, radio communication is performed during use of the same frequency of F2 for the pieces of mobile station apparatus (b) 1304 and (c) 1305, as the interference suppression may be realized. Thereby, the capacity may be improved.

Simultaneously, the frequency F1 which has been assigned by the base station apparatus (a) 1301 to the mobile station apparatus (a) 1303 may be also assigned to the mobile station apparatus (d) 1306 by the base station apparatus (b) 1302.

Usually, communication to the mobile station apparatus (a) 1303 is jammed, as there is interference between a signal transmitted from the base station apparatus (b) 1302 to the mobile station apparatus (d) 1306 through a channel 1311, and a signal transmitted from the base station apparatus (b) 1301 to the mobile station apparatus (a) 1303 through a channel 1307.

However, in the present embodiment, the base station apparatus (a) 1301 may mix a signal element suppressing the above interference into a signal to be transmitted to the mobile station apparatus (a) 1303 through a channel 1307, as the base station apparatus (b) 1302 notifies information on the channel 1311 and a transmission signal to the mobile station apparatus (d) 1306 to the base station apparatus (a) 1301 through the communication channel 1312. Thereby, the base station apparatus (b) may assign to the mobile station apparatus (d) 1306 the frequency F1 which has been assigned to the mobile station apparatus (a) 1303 by the base station (a) 1301.

Thus, in the present embodiment, the frequency efficiency may be improved, and, at the same time, very simple design for frequency assignment may be also realized, as the same frequency may be used for different pieces of base station apparatus.

EMBODIMENT 13

The embodiment 13 will be described for a case where a piece of base station apparatus provided with a piece of apparatus for interference suppression transmission according to the embodiments 1 through 10 is realized. Hereinafter, the present embodiment will be described referring to FIG. 15. Here, a piece of base station provided with the apparatus for interference suppression transmission according to the above embodiment 1 will be described as one example.

Figure 15:
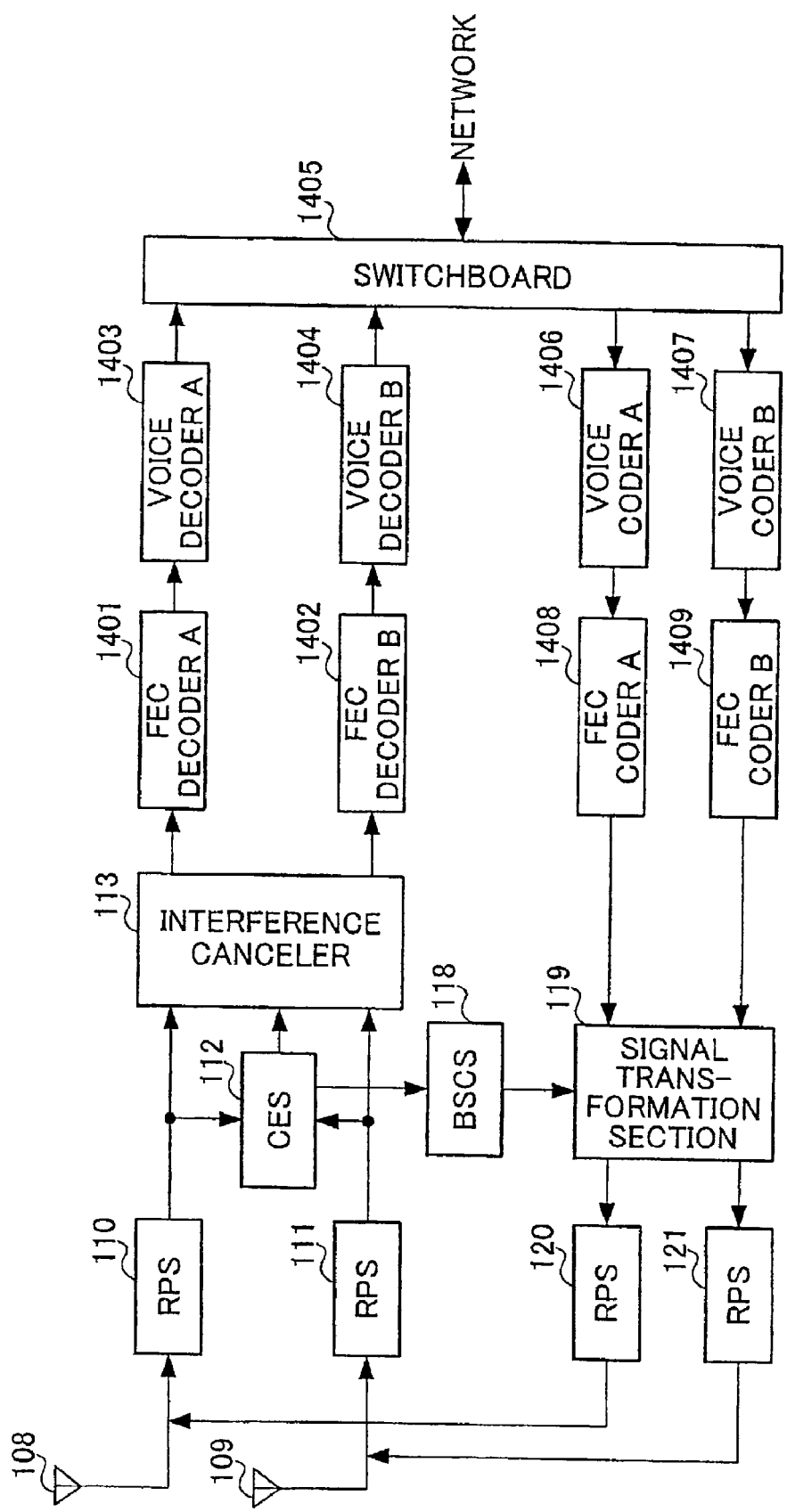
FIG. 15 is a block diagram showing a configuration of a piece of base station apparatus provided with a piece of apparatus for interference suppression transmission according to an embodiment 13 of the present invention.

FIG. 15 is a block diagram showing a configuration of a piece of base station apparatus provided with a piece of apparatus for interference suppression transmission according to the embodiment 13 of the present invention. Here, components which are shown in FIG. 15 and are similar to those in the embodiment 1 (FIG. 2) are denoted by the same reference numerals as those in FIG. 2, and detailed description will be eliminated.

In FIG. 15, processing for error correction decoding of each received signal from the interference canceller 113 is performed by a FEC (Forward Error correction) decoder (A) 1401, and a FEC decoder (B) 1402, respectively. The signals from the FEC decoder (A) 1401 and the FEC decoder (B)

1402 after the above error correction decoding are configured to become voice signals by decoding with a voice decoder (A) 1403 and a voice decoder (B) 1404, respectively. Each voice signal is sent to other pieces of base station apparatus and so on through a switchboard 1405.

And, each voice signal sent through the above switchboard 1405 is encoded by a voice coder (A) 1406, and a voice coder (B) 1407, respectively. The encoded signals from the voice coders (A) 1406 and (B) 1407 are input into the signal transformation section 119 after error correction encoding by the FEC coders (A) 1408, and (B) 1409, respectively.

As described above, according to the present embodiment, it is possible to provide a piece of base station apparatus for transmission of a signal by which each communication end may fetch with a simple configuration signals without effect of interference (and delay waves) by provision of a piece of apparatus for interference suppression transmission according to the embodiments 1 through 10.

EMBODIMENT 14

The embodiment 14 will be described for a case where a piece of mobile station apparatus performing radio communication with a piece of base station apparatus provided with a piece of apparatus for interference suppression transmission according to the embodiments 1 through 10 is realized. Hereinafter, the present embodiment will be described referring to FIG. 16. Here, a piece of mobile station apparatus performing radio communication with a piece of base station apparatus provided with a piece of apparatus for interference suppression transmission according to the embodiments 1 through 10 will be described as one example.

Figure 16:
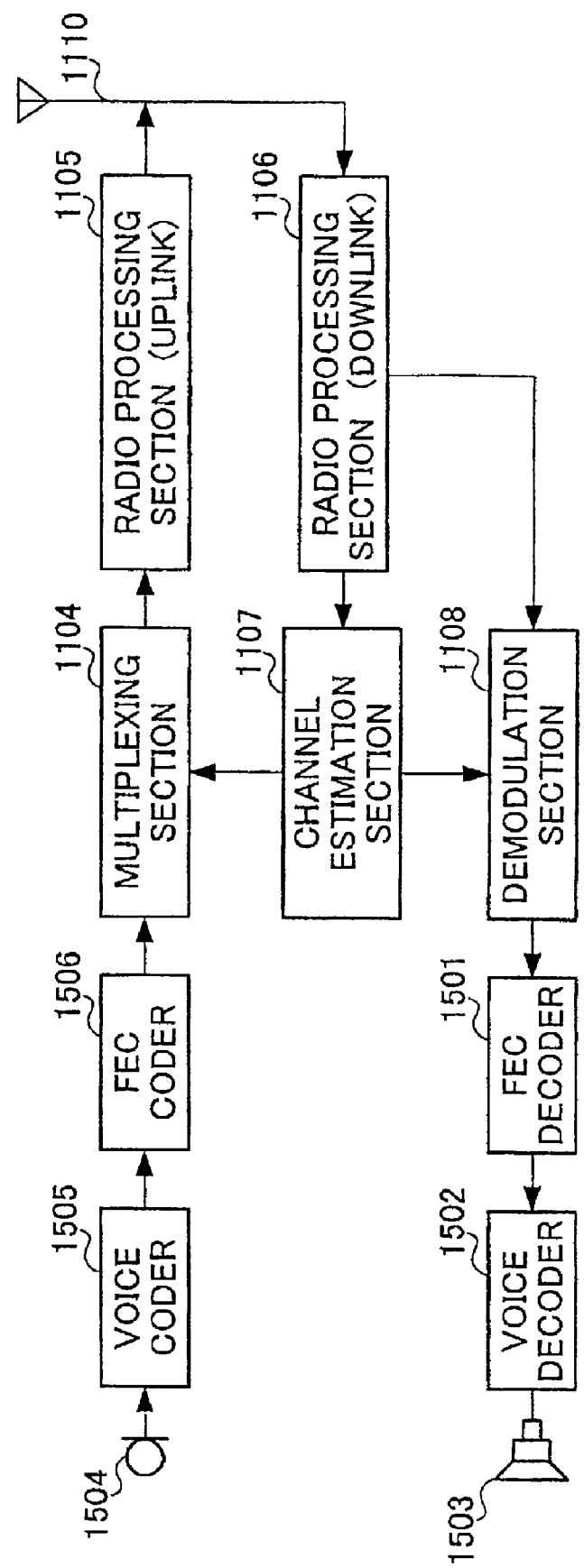
FIG. 16 is a block diagram showing a configuration of a piece of mobile station apparatus which performs communication with a piece of base station provided with a piece of apparatus for interference suppression transmission according to an embodiment 10 of the present invention.

FIG. 16 is a block diagram showing a configuration of a piece of mobile station apparatus which performs communication with a piece of base station provided with a piece of apparatus for interference suppression transmission according to the embodiment 10 of the present invention. Here, components which are shown in FIG. 16 and are similar to those in the embodiment 10 (FIG. 12) are denoted by the same reference numerals as those in FIG. 12, and the detailed description will be eliminated.

In FIG. 16, a demodulation signal from the demodulation section 1108 is decoded by a voice decoder after error correction decoding processing with an FEC decoder 1501. The decoded voice signal is reproduced as a voice by a speaker 1503.

On the other hand, processing for error correction encoding of the voice signal from a microphone 1504 is performed by an FEC coder 1506 after encoding by a voice coder 1505.

The signal after the above processing for error correction encoding is output to the multiplexing section 1104.

As described above, according to the present embodiment, it is possible to provide a piece of mobile station apparatus by which a signal without effect of interference (and delay waves) maybe fetched with a simple configuration by radio communication with a piece of base station apparatus provided with a piece of apparatus for interference suppression transmission according to the embodiments 1 through 10.

The above embodiment has been described for a case where transmission signals to each communication end are transformed for transmission so that effect of interference or delay waves is cancelled at reception by each communication end, but the present invention is not limited to the above case, and is also applicable to other cases where transmission signals to each communication end are transformed so that effects other than those of interference or delay waves are cancelled.

i) The apparatus for interference suppression transmission according to the present invention comprises: reception means for reception of signals sent from each communication end; channel estimation means for estimation of the states of channels used by the above communication end based on signals received by the above reception means; and signal transformation means for transformation of signals to be sent to each of the above communication end, using the above channel estimation results.

According to the above configuration, each communication end may receive high quality signals without installation of a piece of special apparatus for suppression of effects of interference, delay waves, and so on among received signals, as transmission signals to each communication end are transmitted after transformation according to the states of the channels used for the above communication ends so that there is a preferable state at reception by each communication end.

ii) The apparatus for interference suppression transmission according to the present invention comprises a configuration where: the reception means receives signals including information on the estimation results of the channels used at reception by each communication end; and the channel estimation means estimates the states of the channels used at the reception by each of the above communication ends, based on the above information.

According to the above configuration, each communication end may receive high quality signals without installation of a piece of special apparatus for suppression of effects of interference, delay waves, and so on among received signals in communication according to a method by which channels used for transmission and reception are different from each other, for example, according to an FDD method, as transmission signals to each communication end are transmitted after transformation according to the information, notified from the above communication end, on the states of the channels used at reception by the above communication end so that there is a preferable state at reception by each communication end.

iii) The apparatus for interference suppression transmission according to the present invention comprises a configuration where the signal transformation means transforms signals so that each communication end receives signals with cancelled interference between its own signals and those to other communication ends.

According to the above configuration, each communication end may receive high quality signals without installation of a piece of special apparatus, such as an interference canceller, for suppression of interference among received signals as transmission signals to each communication end are transmitted after transformation so that each communication end receives signals with cancelled interference between signals to communication ends. Thereby, each communication end may fetch signals with cancelled effect of interference by a simple configuration.

iv) The apparatus for interference suppression transmission according to the present invention comprises a configuration where the signal transformation means transforms signals so that each communication end receives signals with cancelled effects of delay waves.

According to the above configuration, each communication end may receive high quality signals without installation of a piece of special apparatus for cancellation of effects of delay waves as transmission signals to each communication end are transmitted after transformation so that each communication end receives signals with cancelled effects of delay waves at reception by each communication end. Thereby, each communication end may fetch signals with cancelled effects of delay waves by a simple configuration.

v) The apparatus for interference suppression transmission according to the present invention comprises a configuration where the signal transformation means has training means performing training by use of the channel estimation results, and transforms signals, using the above training results, According to the present configuration, the robustness may be improved, as transmission signals to each communication end are transformed according to the training results using the channel estimation results.

vi) The method for interference suppression transmission comprises: a reception step for reception of signals sent from each communication end; a channel estimation step for estimation of the states of the channels used by the communication end, based on the signals received by the above reception means; and a signal transformation step for transformation of signals to be transmitted to each of the above communication ends, using the above channel estimation results.

According to the above method, each communication end may receive high quality signals without installation of a piece of special apparatus for suppression of effects of interference, delay waves, and so on among received signals, as transmission signals to each communication end are transmitted after transformation according to the states of the channels used by the above communication ends so that there is a preferable state at reception by each communication end.

vii) In the method for interference suppression transmission according to the present invention, the reception step receives signals including information on the estimation results of the channels used at reception by each communication end; and the channel estimation step estimates the states of the channels used at reception by the above communication end, based on the above information.

According to the present method, each communication end may receive high quality signals without installation of a piece of special apparatus for suppression of effects of interference, delay waves, and so on among received signals in communication according to a method by which channels used for transmission and reception are different from each other, for example, according to an FDD method, as transmission signals to each communication end are transmitted after transformation according to the information, notified from the above communication end, on the states of the channels used at reception by the above communication end so that there is a preferable state at reception by each communication end.

As described above, according to the present invention, it is possible to provide a piece of apparatus for interference suppression transmission by which each communication end may receive high quality signals with cancelled effects of interference or delay waves by a simple configuration, as the transmission signals to each communication end are transmitted after transformation so that effects of interference between signals to communication ends, or delay waves are cancelled at reception by each communication end.

The present application is based upon Japanese Patent Application Hei-11 (1999)-358744, filed on Dec. 17, 1999. The entire contents are incorporated herein by reference.

INDUSTRIAL APPLICABILITY

The present invention is preferable for application to a piece of communication apparatus provided with an interference canceller.

The invention claimed is:

1. A base station apparatus that performs radio communication with a plurality of mobile station apparatuses concurrently, the base station apparatus comprising:
   a plurality of antennas provided in a greater number than the plurality of mobile station apparatuses;
   a receiver that receives a plurality of signals from the plurality of mobile station apparatuses via the plurality of antennas;
   an estimator that estimates channel estimation values between the plurality of mobile station apparatuses and the plurality of antennas using the plurality of signals;
   a transformer that performs linear transformation of a plurality of transmission signals using coefficients determined from the channel estimation values estimated in the estimator; and
   a transmitter that transmits the plurality of transmission signals subjected to linear transformation to the plurality of mobile station apparatuses via the plurality of antennas, wherein:
   the transformer performs linear transformation of the plurality of transmission signals in accordance with the formula:

$$|Sig_{out}|_{M \times 1} = |x|_{N \times M} |Sig_{in}|_{N \times 1}$$

where:
   N is the number of the plurality of mobile station apparatuses and M is the number of the plurality of antennas;
   $|Sig_{out}|_{M \times 1}$ is a matrix of the plurality of transmission signals subjected to linear transformation in the transformer;
   $|x|_{N \times M}$ is a matrix of the coefficients; and
   $|Sig_{in}|_{N \times 1}$ is a matrix of the plurality of transmission signals before linear transformation in the transformer.

2. The base station apparatus of claim 1, wherein the transformer performs linear transformation of the plurality of transmission signals so that interference is cancelled from the plurality of transmission signals upon reception at the plurality of mobile station apparatuses.

3. The base station apparatus of claim 1, wherein the transformer performs linear transformation of the plurality of transmission signals so that influence of delay waves is removed from the plurality of transmission signals upon reception at the plurality of mobile station apparatuses.

4. The base station apparatus of claim 1, further comprising a coefficient calculator that calculates the coefficients used in the transformer through inverse matrix operation using the channel estimation values estimated in the estimator.

5. The base station apparatus of claim 4, further comprising a selector that selects the same number of antennas as the plurality of mobile station apparatuses from the plurality of antennas for use in the inverse matrix operation.

6. The base station apparatus of claim 1, further comprising a trainer that determines the coefficients used in the transformer through training processing using the channel estimation values estimated in the estimator.

7. The base station apparatus of claim 6, further comprising a generator that generates noise having an equivalent level as an anticipated level of noise at the plurality of mobile station apparatuses, wherein the trainer incorporates the noise generated in the generator in the training processing.

8. The base station apparatus of claim 6, further comprising a selector that selects the same number of antennas as the plurality of mobile station apparatuses from the plurality of antennas for use in the training processing.

* * * * *